US007123742B2

(12) United States Patent
Chang

(10) Patent No.: US 7,123,742 B2
(45) Date of Patent: *Oct. 17, 2006

(54) PRINT USER INTERFACE SYSTEM AND ITS APPLICATIONS

(76) Inventor: Kenneth H. P. Chang, 1106 Blythe St., Foster City, CA (US) 94404

( * ) Notice: Subject to any disclaimer, the term of this patent is extended or adjusted under 35 U.S.C. 154(b) by 745 days.

This patent is subject to a terminal disclaimer.

(21) Appl. No.: 10/186,518

(22) Filed: Jul. 1, 2002

(65) Prior Publication Data

US 2003/0189731 A1    Oct. 9, 2003

Related U.S. Application Data

(60) Provisional application No. 60/370,626, filed on Apr. 6, 2002.

(51) Int. Cl.
*G06K 9/00* (2006.01)
(52) U.S. Cl. .................... 382/100; 358/3.28; 380/51; 380/55; 382/192; 382/205
(58) Field of Classification Search ............... 382/100, 382/192, 205; 358/3.28; 380/51, 55
See application file for complete search history.

(56) References Cited

U.S. PATENT DOCUMENTS

| 4,263,504 A | 4/1981 | Thomas |
| 4,939,354 A | 7/1990 | Priddy et al. |
| 5,128,525 A | 7/1992 | Stearns et al. |
| 5,189,292 A | 2/1993 | Batterman et al. |
| 5,245,165 A | 9/1993 | Zhang |
| 5,278,400 A | 1/1994 | Appel |
| 5,329,107 A | 7/1994 | Priddy et al. |
| 5,343,031 A | 8/1994 | Yoshida |
| 5,507,527 A | 4/1996 | Tomioka et al. |
| 5,515,447 A | 5/1996 | Zheng et al. |
| 5,521,372 A | 5/1996 | Hecht et al. |
| 5,541,396 A | 7/1996 | Rentsch |
| 5,572,010 A | 11/1996 | Petrie |
| 5,576,532 A | 11/1996 | Hecht |
| 5,583,941 A * | 12/1996 | Yoshida et al. ............... 380/51 |
| 5,591,956 A | 1/1997 | Longacre, Jr. et al. |
| 5,633,489 A | 5/1997 | Dvorkis et al. |
| 5,646,997 A | 7/1997 | Barton |

(Continued)

FOREIGN PATENT DOCUMENTS

EP    0777197    6/1997

(Continued)

*Primary Examiner*—Gregory Desire
(74) *Attorney, Agent, or Firm*—Philip S. Yip

(57) ABSTRACT

A print (e.g., on paper) user interface (PUI) device for decoding an embedded message to activate a function is described. The PUI can be used for transforming an embedded message into cognizable human sensory inputs. The device includes a reader and a processor. The reader can sense light from a pattern of pixels on a printed surface and determines the pixel values of the pixels. The pattern of pixels constitutes a foreground visual image that conveys cognizable information to an observer. The primary function of the embedded message need not be to launch a Web-site but to display more information related to the cognizable information. The processor has a program of computer codes readable by the processor to recover embedded message from the pattern of pixels, the program includes codes for determining the embedded message by determining binary values based on the pixel values for pixels from the pattern of pixels and codes for performing a function according to the embedded message to result in resultant information displayable by a display suitable for human sensory reception.

41 Claims, 26 Drawing Sheets

U.S. PATENT DOCUMENTS

| | | | |
|---|---|---|---|
| 5,748,783 A | 5/1998 | Rhoads | |
| 5,761,686 A | 6/1998 | Bloomberg | |
| 5,765,176 A | 6/1998 | Bloomberg | |
| 5,771,245 A | 6/1998 | Zhang | |
| 5,841,978 A | 11/1998 | Rhoads | |
| 5,850,481 A | 12/1998 | Rhoads | |
| 5,905,248 A | 5/1999 | Russel et al. | |
| 5,946,414 A * | 8/1999 | Cass et al. | 382/183 |
| 5,956,419 A | 9/1999 | Kopec et al. | |
| 5,966,637 A | 10/1999 | Kanungo et al. | |
| 6,023,525 A * | 2/2000 | Cass | 382/162 |
| 6,076,738 A | 6/2000 | Bloomberg et al. | |
| 6,256,398 B1 * | 7/2001 | Chang | 382/100 |
| 6,345,104 B1 * | 2/2002 | Rhoads | 382/100 |
| 6,427,020 B1 * | 7/2002 | Rhoads | 382/100 |
| 6,577,748 B1 * | 6/2003 | Chang | 382/100 |
| 6,757,407 B1 * | 6/2004 | Bruckstein et al. | 382/100 |
| 6,819,776 B1 * | 11/2004 | Chang | 382/100 |
| 2003/0189731 A1 * | 10/2003 | Chang | 358/3.28 |

FOREIGN PATENT DOCUMENTS

| | | |
|---|---|---|
| WO | WO 97/32262 | 9/1997 |

* cited by examiner

Fig. 4B

| BP1 | BP2 | BP3 | BP4 | BP5 |
|---|---|---|---|---|
| BP6 | GP0 | BP7 | BP8 | BP9 |
| BP10 | BP11 | BP12 | BP13 | BP14 |
| BP15 | BP16 | BP17 | GP1 | BP18 |
| BP19 | BP20 | BP21 | BP22 | BP23 |

| BP1 | BP2 | BP3 | BP4 | BP5 |
|---|---|---|---|---|
| BP6 | BP7 | BP8 | BP9 | BP10 |
| BP11 | BP12 | GP | BP13 | BP14 |
| BP15 | BP16 | BP17 | BP18 | BP19 |
| BP20 | BP21 | BP22 | BP23 | BP24 |

← 400 (BP3)
↑ 401 (BP1)
↑ 402 (GP)

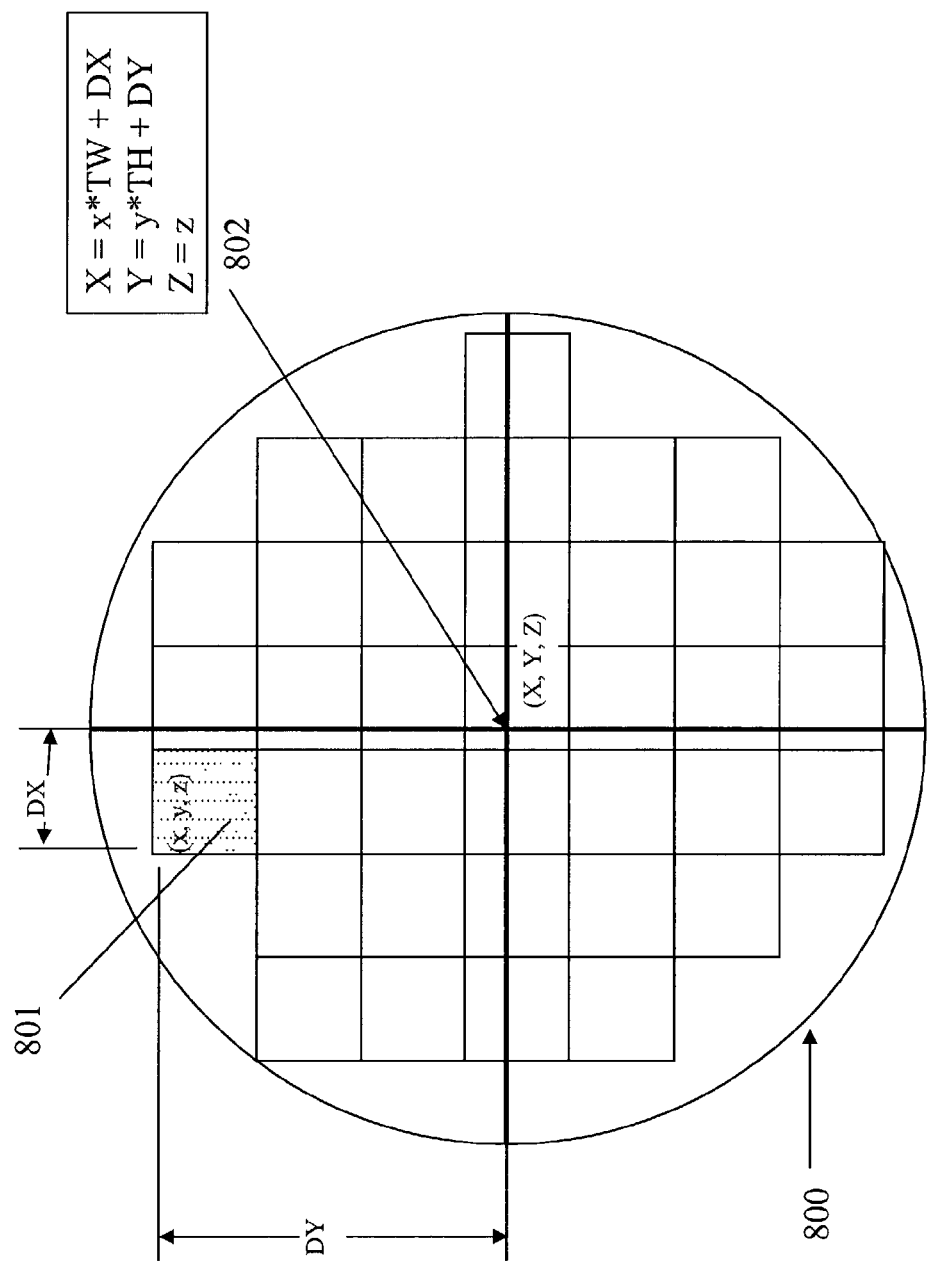

PRINT USER INTERFACE SYSTEM AND ITS APPLICATIONS

RELATED APPLICATION

The present application is based upon and claims priority benefit of provisional application Ser. No. 60/370,626, entitled "PRINT USER INTERFACE SYSTEM AND ITS APPLICATIONS", which was filed on Apr. 6, 2002.

FIELD OF THE INVENTION

The present invention relates to techniques for encoding and decoding multi-dimensional coordinates information and more particularly to techniques for encoding 3D coordinates information into an image in which the coordinates are not decodable by visual inspection and for decoding the coordinates information using a convenient handheld device, and translating the coordinates into user definable functions and resources.

BACKGROUND

With the progress of science and technology, knowledge is increasing at an accelerating pace. As a result, the amount of information that needs to be stored and retrieved is also increasing rapidly. The ability to conveniently retrieve stored information is becoming a limiting factor for many people to gain meaningful access to knowledge. In the past, printed materials such as books have been, and still is, a common way for many to access information. As the amount of information that requires storage grows at an ever escalating pace, storage in electronic form is preferred. For example, information nowadays is often stored in computer memory, hard drives, zip disks, floppy disks, compact disks, memory cartridges, tapes, and the like. Such electronic form of information in turn requires suitable tools for retrieval, since humans have no natural ability or sensory organ that can access information from electronic storage media directly.

Information stored in electronic storage media is usually retrieved through the use of electronic instruments such as computers, CD players, tape player, game consoles, and the like. However, an information retrieval involving locating a portion from a large volume of data generally involves using computer. Typically, people access information from a computer by using a keyboard, a monitor, and perhaps a pointer device such as a mouse. In many cases, text based interfaces and graphical user interfaces (GUIs) have been used. Recently, GUIs have become the user interface of choice for accessing electronic forms of information. GUIs provide an intuitive way for people to interact with computers. For example, GUIs use graphical representation of real world objects such as file folders, cabinets, and trash cans to help users learn applications faster. Such real world objects are present in popular computer operation systems such as Windows by Microsoft Corp. and Macintosh by Apple Computers Co. More recently, the hyper text markup language (HTML) has become the standard for interfacing with the Internet. Linked text and graphic objects are marked by underlines and/or colors to signal that they are hypertext and accessible. For example, while browsing the Internet, by maneuvering the pointer onto the hypertext (e.g., Johnson's Bakery) on the computer monitor and clicking a mouse will cause the browser to go to the Johnson's Bakery's Web-site).

However, traditional GUIs and HTML require a reasonable-sized computer screen with a fine resolution for them to function effectively, which often means using a cumbersome computer with a heavy monitor. Such requirements severely limit their use in more mobile applications. What is needed is a technique to access electronic information with a convenient, easily movable GUI device.

SUMMARY

This invention provides techniques for interfacing with an image with embedded multiple dimensional (MD, e.g., 3D) coordinates. In one aspect of the invention, the present invention provides a technique to embed and/or retrieve useful information by recovering the MD (3D) coordinates information that has been embedded in a visual image. In this technique, the MD, e.g., 3D, coordinates information is first embedded in the visual image which has cognizable information. A handheld device can be used to interrogate the visual image to decode the embedded message to activate a response. The handheld device senses a pattern of light from the visual image and performs a function according to the coordinate embedded in the visual image. As used herein, the term "handheld" refers to a device, such as a pen, mouse, cellular phone (cell phone), personal digital assistant (PDA), that is small and light enough to be moved about with ease by one hand on a surface such as a page in a book.

The present invention is particularly suitable for requesting information by decoding embedded MD, e.g., 3D, coordinates information from a printed pattern of pixels for quick, local display wherein the embedded coordinates in the printed pattern can be translated to an information resource and/or function pointers. The function pointers can lead to performance of the desired function to call up the desired information. The pixels can be printed each with ink dots. This invention provides ease of operation and fast responses. It is contemplated that if inadequate information is gathered locally, the processor of the device can be caused to search for appropriate information in the Internet if the handheld device is connectable to the Internet.

In one aspect, a handheld device of the present invention can be used for transforming embedded coordinates information into cognizable human sensory inputs. The device can include a reader and a processor. The reader can sense light from a pattern of pixels (including dots) on a printed surface and determine the pixel values of relevant pixels. The pattern of pixels constitutes a foreground visual image that conveys cognizable information to an observer. Thus, by merely looking at the pattern of pixels, the view will be able to recognize certain meaningful information, such as a familiar image, word, number, symbol, picture, graphic design that can be easily recalled and recognized, and the like. The processor has a program of computer codes for recovering embedded coordinates from the pattern of pixels, the program includes a code means for determining the embedded coordinates by determining binary values based on the pixel values for pixels from the pattern of pixels and code means for performing a function according to the embedded coordinates to call up (or lead to) resultant information displayable by a display suitable for human sensory reception. Pointers to desired information can be embedded in the patterns of pixels, which can be decoded to translate through a predefined mapping table to arrive at the requested information. Further, the device can include a display to display the information for human sensory reception.

The device of the present invention is particularly useful for interactive operation. For example, as a user sees a printed page with a visually cognizable image of interest to him, he can use the device to decode a particular pixel pattern from a printed page to receive further detailed information related to the visually cognizable image. Upon receiving the further detailed information, the user may be prompted or directed by that information to use the device to decode another area of the printed page or a different page. In other cases of interactive operation, to obtain information of interest, the user will use the device to activate at two or more locations of a document to launch information related to both locations. For example, in a map application, a user can activate on a button on "hotels" and activate on a street location to provide the hotels at the neighborhood of that location.

Examples of the graphical user interface (GUI) systems are particularly useful in print form (print user interface, PUI) and includes active printed book systems, active printed map systems, active printed keyboard systems, active package labels, and the like. In fact, to retrieve useful information from printed matters, the printed matters having the proper embedded message will have to be selected. The printed matters that are PUI compatible with the device will have labels that indicate the compatibility. In such systems, the active devices of the present invention can be activated by imaging a pattern of printed pixels for the analysis of coded embedded coordinates which then can be translated to launch the activation of a program to produce human sensory information, such as an audio, tactile, and/or visual program. Such devices provide useful information with great convenience. In certain embodiments, all that is needed is a printed page with the embedded information and a hand-held device, which, for example, may have a shape and size resembling those of a pen. The device can have a body storing the desired information and program and a display for displaying the desired information once the device is activated to decode a hotspot on the printed page. As used herein, the term "display" can be visual, audio, or tactile, unless specified in context to be otherwise. Devices of this nature can be carried conveniently on a daily basis in a variety of environments. They are easy to use because a bulky, regular keyboard is not needed. A printed page with the embedded coordinates and the handheld device for interrogating it can be easily put into a pocket, purse and the like. All that is required to launch a display of the relevant information is simply "point and click." Such graphical user interface systems can be used even by children for enjoyment as well as for learning. In many cases, the systems are nonWeb-site related in that there is no Web-site information or function directly embedded in the print. In some cases, the primary function of the system is to display information contained locally in the system, only to call on a Website (e.g., address contained in the device) on the Internet when the requested information is not found locally. In some cases, the graphical user interface system can launch a Web-site directly.

The PUI of the present invention can provide a large volume of embedded information, much more than conventional systems such as bar codes can. For example, words, pointers to data, websites, and many lines of text can be embedded on a package related to the explanation of a consumer product. Streams of voice or music data can be embedded in a page of a book. Such capabilities provide great flexibility in product design.

BRIEF DESCRIPTION OF THE DRAWINGS

The following figures are included to better illustrate the embodiments of the apparatus and technique of the present invention. In these figures, like numerals represent like features in the several views. It is to be noted that in these figures, unless stated to be otherwise, the dots are artist's rendition of pixels patterns.

FIG. 4A and FIG. 4B show embodiments of HyperCode Cells of the present invention.

FIG. 8 shows the relationship between a known tile location and the center of field of view.

FIG. 9E shows a Cell Map derived from FIG. 9B.

FIG. 9F shows a Data Map derived from FIG. 9B and FIG. 9C.

FIG. 9K shows a Cell Map derived from FIG. 9I.

FIG. 9L shows a Data Map derived from FIG. 9I and FIG. 9J.

DETAILED DESCRIPTION

Figure 1:
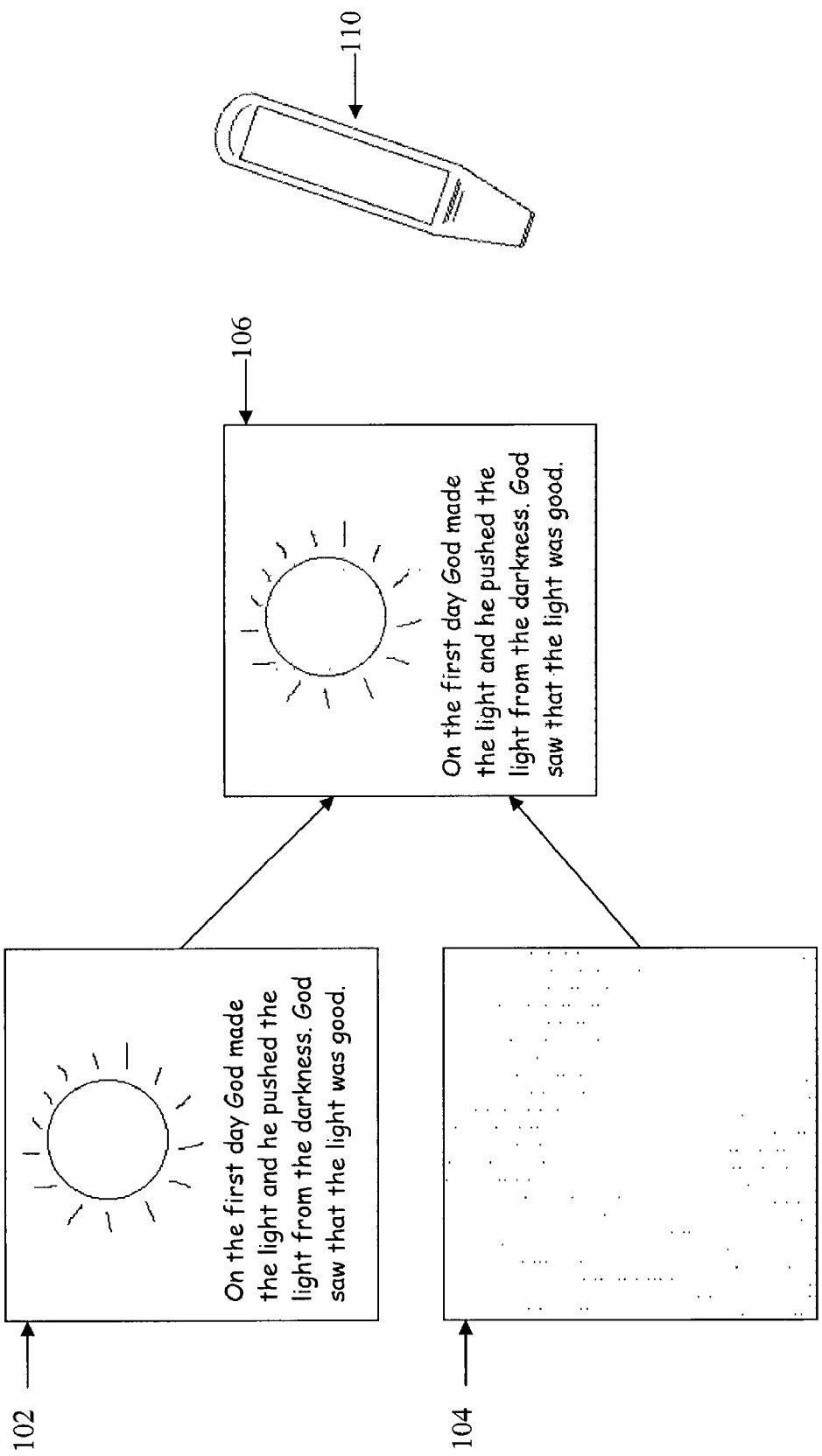
FIG. 1 shows an embodiment of a print user interface system of the present invention.

In one aspect, the present invention provides a technique to embed 3D coordinates into a coded visual image having cognizable information and a technique to decode the visual image for retrieval of the embedded multiple dimensional, such as 3D, coordinates and to translate the coordinates into local and/or remote resources. In another aspect, the invention provides a handheld device to sense the visual image from a GPUI (graphical print user interface) and decode it.

Various ways of coding information have been used in the past. For example, U.S. Pat. No. 4,263,504 (Thomas); U.S. Pat. No. 5,189,292 (Batterman et al); U.S. Pat. No. 5,128,525 (Stearns et al.); U.S. Pat. No. 5,221,833 (Hecht); U.S. Pat. No. 5,245,165 (Zhang); U.S. Pat. No. 5,329,107 (Priddy et al.); U.S. Pat. No. 5,439,354 (Priddy); U.S. Pat. No. 5,481,103 (Wang); U.S. Pat. No. 5,507,527 (Tomioka, et al.); U.S. Pat. No. 5,515,447 (Zheng, et al); U.S. Pat. No. 5,521,372 (Hecht, et al.); U.S. Pat. No. 5,541,396 (Rentsch); U.S. Pat. No. 5,572,010 (Petrie); U.S. Pat. No. 5,576,532 (Hecht); and U.S. Pat. No. 5,591,956 (Longacre, et al.) are examples of descriptions of the use of two dimensional symbology in storing encoded information. U.S. Pat. No. 6,256,398 (Chang), issued on Jul. 3, 2001 and commonly owned by the same entity as the present invention, discloses devices and methods for coding and decoding messages. The disclosures of these cited patents are incorporated by reference herein in their entirety.

A Print User Interface System

Print user interfaces (PUIs) of the present invention replicate some of graphical user interfaces' (GUIs) functionalities on prints, thereby providing the convenience of retrieval of digital information by "reading" from printed matter. Like GUIs, PUIs use graphical representation of real world objects, or real life objects, such as keyboards, maps, buttons, clickable text, symbols, and objects with visually recognizable characteristics for user-friendly interface. Unlike GUIs that are associated with applications on computer screens, PUI's are static in their appearance (i.e., the graphics, being in printed form, do not change during the interrogation for information retrieval). Further, there is not a need for wired electrical link between the print and the device in which the desired information is stored. Rather, the image from the print is captured via light by a PUI device to render the appropriate response. Although PUIs provide functionalities that are more limited than GUIs, a distinctive advantage of PUI over conventional GUI is its compact nature. Every printed surface can be a PUI, for example, pages on books and/or magazine (which are usually printed on paper). In fact, surfaces on packages, boxes, containers, tools, utensils, or just about anything that has a printable surface can be used. The print contains patterns of pixels. Media on which the pattern of pixels are printed can be any solid material with a smooth surface, such as paper, ceramic, metal, plastic, glass, plant material such as wood, etc.

FIG. 1 shows an exemplary embodiment of a PUI system. The PUI system (FIG. 1) contains three parts: an image 102 (for example, a page in a book) containing graphics and/or text with pixel pattern having embedded information, PUI data 104, and a handheld input/output device 110. With PUI data 104 embedded within the image 102, the combined image 106 is a digital map, or a HyperCode Map. As used herein, "graphics" can include pictures, cartoons, photographs and shapes of a nature not typically found on keyboards; "text" can include characters, letters, signs, and symbols typically found on keyboards. "HyperCode" means a coding system that is used for embedding message in a print according to the present invention. The HyperCode Map functions as an interface medium, providing meaningful information to users via graphics/text and digital interfaces to various devices through the embedded interface data. Note that the embedded interface data can be read later by various devices including handheld devices, which are more preferred than more cumbersome readers. The devices, equipped with a built-in camera in conjunction with a screen, can be both an input and an output device that reads embedded interface data from a HyperCode Map, and displays text, graphics, or plays back audio and/or video signals accordingly.

A PUI such as HyperCode Map 106 in FIG. 1 is a print surface with printed text and graphics for human perception and digital data embedded within the printed text and graphics for interfacing with PUI devices. A PUI performs at least two functions: first, interfacing with humans through printed text and graphics; second, interfacing with PUI devices through PUI data embedded within the printed text and graphics. There are several characteristics to a good PUI. First, PUI data can be embedded easily within print content, and be read back quickly and correctly. Second, general text and graphic layout (or appearance) of a PUI will not change after PUI data are embedded within it. Third, the embedded PUI data would not interfere with human perception of print contents. If there is any change in the print pattern, the change is insignificant visually to a view as to distract the viewer from easily recognizing the visually recognizable image in the PUI. Generally, any print surface such as printed papers, books and magazines can be used as a PUI when PUI data are embedded within the print pattern on the printed surface.

A PUI device preferably is an input and output device for both reading embedded PUI data from PUIs and playing back responses to users. A typical PUI device could be like a handheld MP3 player with an optical sensor for reading PUI data embedded within text and graphics and an audio speaker for playing back audios. In some embodiments, the input device and the playback device can be separate pieces.

The first key element to good PUI is that PUI data can be embedded within printed images and be recovered correctly. The Chang technique in U.S. Pat. No. 6,256,398 describes a method of embedding messages within visual images and reading them back correctly using an optical reader. In the present invention, generally, PUI data are embedded within images which may includes text and graphics. Either color images or grayscale images or images in a single color can be used. Images are made of pixels, and the value of the pixels in an image can be altered so that extra data such as PUI data can be embedded. PUI data are encoded as a coordinate system in a multi-dimensional (e.g., 3D) space. Any point in this exemplary 3D space is identified by its coordinate (X, Y, Z). When PUI data are embedded in a printed image, the image becomes a digital map (HyperCode Map) since any data point in that image becomes identifiable by recovering the embedded coordinate.

For the purpose of efficient data embedding and recovering, pixels in an image are grouped into cells, cells are grouped into tiles, and tiles are grouped into a map A HyperCode cell holds bits of PUI data, such as bits of a coordinate (X, Y, Z). A HyperCode tile holds the data of a single coordinate (X, Y, Z). A HyperCode map holds the complete coordinates of a printed surface, such as a page in a book. Such HyperCode tiles may be simply called "tiles" and HyperCode cells may be simply called "cells."

HyperCode Map

A HyperCode Map is a printed image with PUI data embedded in it. A HyperCode Map has two faces, a visual face 106 in FIG. 1 and an embedded digital face 200 in FIG. 2. A HyperCode Map (FIG. 2) provides a coordinate system to a printed image such that any point in the image can be identified by a coordinate (X, Y, Z), where the coordinate (X, Y) identifies a location point in that image, and "Z" a map identification (ID). It is noted that "Z" component can either be a generic map ID or an application dependent data. To enable interfacing with a processor such as a computer, points in the image may be linked to various functions (will be explained in Action Table section below) such that when certain conditions are met, the linked function can be executed. For example, a linked function such as "IncreaseSpeakerVolume( )" (i.e., a function to increase speaker's volume) is executed when conditions such as X>0 and X<20, Y>0 and Y<20, and Z=7777777 are met.

Figure 2:
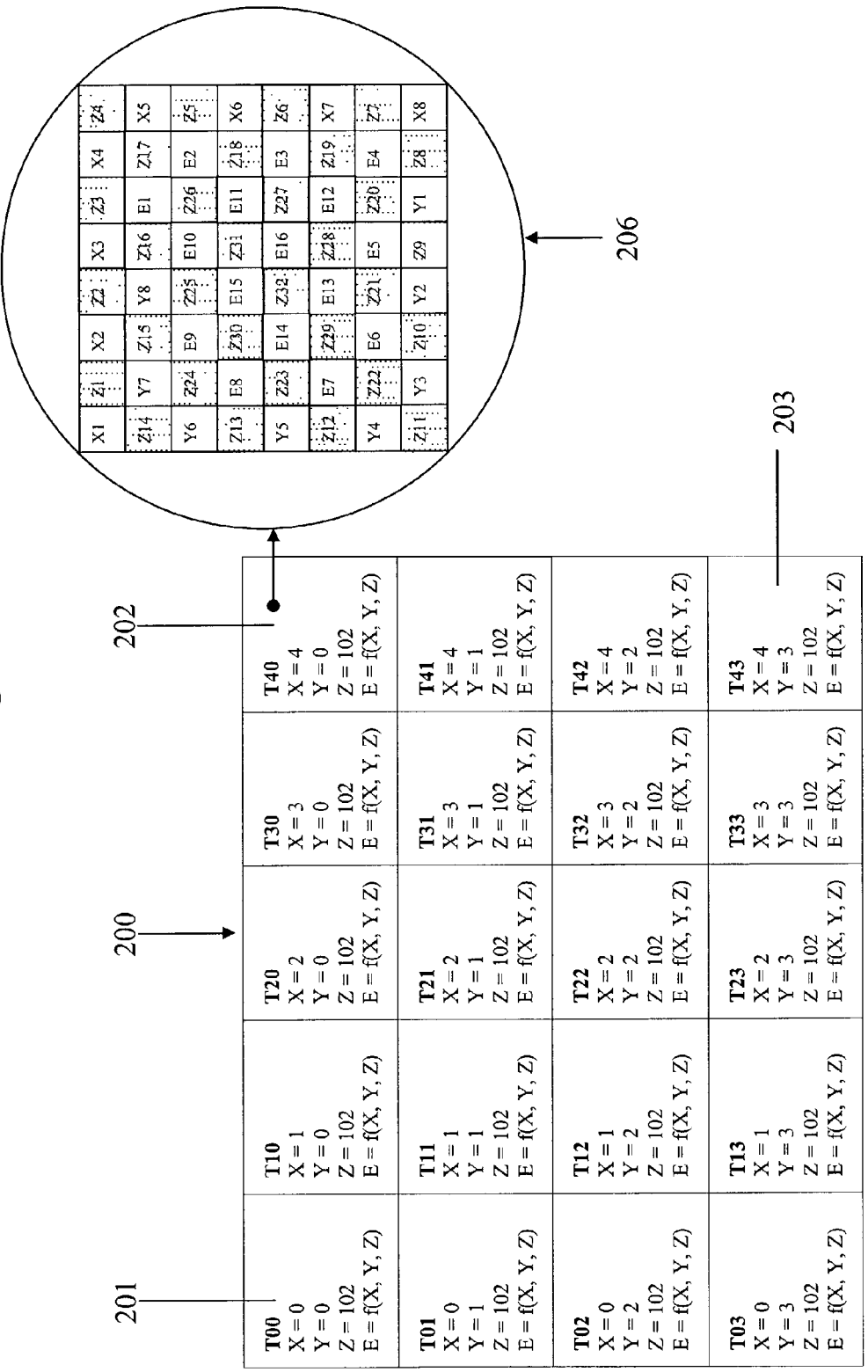
FIG. 2 shows an embodiment of a HyperCode Map of the present invention.

HyperCode maps are made of an array of HyperCode tiles. As an illustration, FIG. 2 shows a HyperCode map 200 made of an array of 5 by 4 tiles, such as tile 201, tile 202, etc. Preferably, each tile has an array of 8 by 8 cells although other number of cells can be used, and each cell holds one data bit. Blow up 206 shows the detail of the exemplary tile T40. HyperCode map stores data and their locations in a plurality of tiles, such as tiles 201, 202, etc., and each tile holds a single coordinate (X, Y, Z) and its location information in it.

HyperCode Tile

Figure 3:
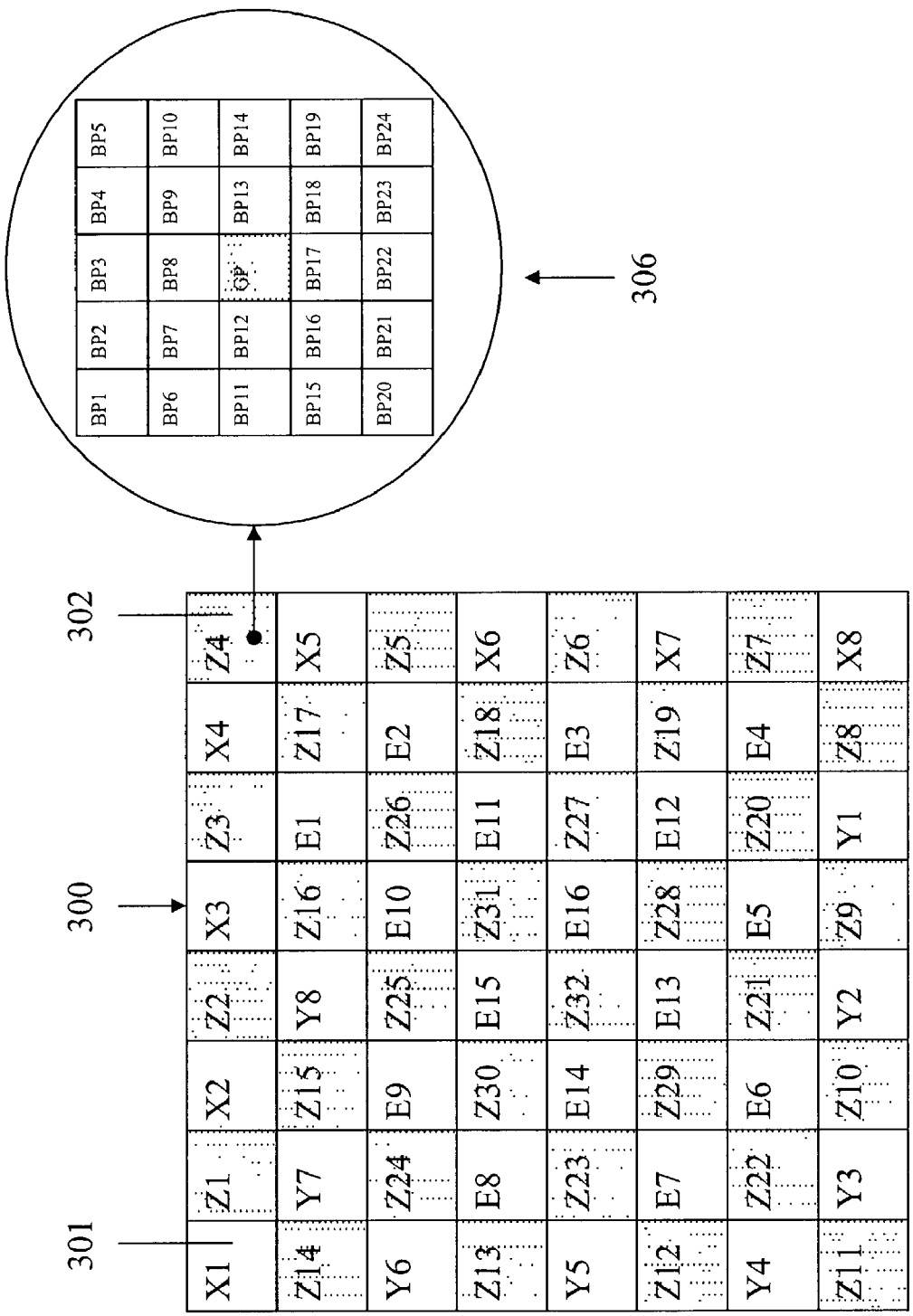
FIG. 3 shows an embodiment of a HyperCode Tile of the present invention.

As a further illustration, FIG. 3 shows an embodiment of a HyperCode tile. The HyperCode tile (FIG. 3) has four components, X, Y, Z and E, where X represents the tile's horizontal location, Y the tile's vertical location, Z the tile's data and E the tile's error correction component. The Z component (i.e. the tile's data) can be a generic map ID or an application dependent data. The E component is a function of X, Y and Z, and is used to correct possible errors in X, Y and Z. Many popular error correct functions such as BCH and Reed-Solomon can be used to compute the value of E. Based on the present disclosure, one skilled in the art will be able to implement appropriate error correction using these error correction functions or other alternative functions. Generally, Z components are the same for all tiles within one HyperCode Map, X and Y components vary depending on the tile's location, and E components are unique for each tile. Based on the present invention, other components can be added to a tile, and other error correction techniques known in the art can also be used by one skilled in the art.

A HyperCode tile is a 2D array of HyperCode cells. FIG. 3 depicts an illustrative HyperCode tile 300 with interleaved X, Y, Z and E components. In this exemplary tile 300, an array of 8 rows by 8 columns of cells (such as cells 301, 302) represents a total of 64 bits with 8 bits allocated to X (i.e., X1 to X8), 8 bits to Y (i.e., Y1 to Y8), 32 bits to Z (i.e., Z1 to Z32) and 16 bits to E (i.e., E1 to E16). Given the tile configuration of FIG. 3, X and Y each range from 0 to 255 ($2^8$ values) with a cell resolution of 2,048 (i.e., $2^8 \times 8 = 2048$). Blow up 306 shows the details of cell 306 at location Z4. The cell 306 includes a glyph pixel (GP) surrounded by background pixels (BPs). Note that there is a maximum of 256 tiles in X and Y, with each tile containing 8 cells, therefore the cell resolution is 256×8=2048. Z is a 32-bit application specific data. The error correction component E is a function of X, Y and Z, and it occupies 16 bits. The binary bit value (i.e., 1 or 0) of each bit can be represented by a cell similar to the cells of FIG. 4, FIG. 5, FIG. 6 in U.S. Pat. No. 6,256,398, or cell 400 of FIG. 4A and cell 404 of FIG. 4B of the current invention. Of course, other tiles can be designed with different number of bits allocated to X, Y, Z, E, etc. Furthermore, the order or sequence of the arrangement of X, Y, Z, and E of FIG. 3 are for illustration only and can be varied by one skilled in the art.

In application, assuming tile 300 of FIG. 3 is printed using 6×6 pixel cells in the resolution of 600 DPI (dots per inch), the cells would have a dimension of 0.01 inch by 0.01 inch on paper, and tile 300 of FIG. 3 a dimension of 0.08 inch by 0.08 inch, about the size of one (12 points) letter. In an "active boo" application (described later), 20 bits of Z together is interpreted as the book number and 12 bits of Z is interpreted as the page number. Tiles of such a configuration can be used to encode up to 1,048,576 (i.e., $2^{20}=1,048,576$) books, with each book containing up to 4,096 (i.e., $2^{12}=4,096$) pages. Of course, larger or smaller cells (such as those shown in FIG. 4, FIG. 5, FIG. 6 in U.S. Pat. No. 6,256,398, and the like) can also be used. Furthermore, each page can be as large as 20.48 inches by 20.48 inches (i.e., 0.08 inch×256=20.48 inches) with maximum horizontal and vertical measurement of 2,048 (sub-tile/cell resolution). In sum, this configuration affords the following:

Book Number (20 bits) ranges from 0 to 1,048,575
Page Number (12 bits) ranges from 0 to 4,095
X measurement ranges from 0 to 2,047 cells
Y measurement ranges from 0 to 2,047 cells
X and Y resolution are 100 DPI respectively (i.e. 600 DPI print resolution, and 6×6 cells) Modern printers with print resolutions of 1200 DPI, 2400 DPI, or even finer DPI are readily available. With the present invention, embedded messages can re recovered from prints that have been encoded according to the present invention and yet still allow text of commonly used font sizes (e.g., Courier 10 point, 12 point, etc.) to be recognized by the user.

HyperCode Cell

In one aspect, a HyperCode cell has a two dimensional (2D) array of pixels. Pixels in a cell are designated as either glyph pixels GP or background pixels BP. FIG. 4A and FIG. 4B show two 5×5 exemplary HyperCode cells 400 and 404. Within cell 400, there are one glyph pixel GP (402) and 24 background pixels BP1 to BP24 (401). GP 402 is in the center of a twenty five pixels square and is surrounded by twenty four BPs 402 arranged in two layers. Within cell 404, there are two glyph pixels GP0 and GP1 (406, 407 in FIG. 4B), and 23 background pixels BP1 to BP23 (405). An alternative embodiment cell 400 of FIG. 4B shows two GPs 406, 407 being in a tile containing 25 pixels, in which the GPs 406 and 407 are each surrounded on four sides by eight immediate GPs as a nine pixels square for each GP. In general there can be m GPs and n BPs within a cell. By altering the relationship between GPs and BPs, digital data can be embedded into cells.

Data Embedding Methods

Chang's U.S. Pat. No. 6,256,398 describes a method of embedding binary bit into a cell by maximizing a cell contrast (CC) which is a function of pixel values of all the pixels within a cell.

$$CC = ABS((GP_1 + GP_2 + \ldots + GP_m)/m - CW)$$

$$CW = (BP_1 + BP_2 + \ldots + BP_n)/n$$

Where, in this equation CC means cell contrast, CW means cell weight, ABS means absolute function, and $GP_1$, $GP_2$ and $GP_m$ are the pixel values of glyph pixels, and $BP_1$, $BP_2$, $BP_n$ are the pixel values of background pixels. Note that cell weight CW is the average pixel value of BPs.

With the Chang technique, the cell contrast CC can be changed by 1) changing the values of the GP or GPs (if there are more than one GP in a cell) only, or 2) changing the values of both GP(s) and BPs. In the first case, to encode a binary bit "1", the pixel value of GP(s) needs to be changed so that the associated cell contrast is large, preferably, the largest possible, (preferably keeping the background pixels constant, as stated previously). On the other hand, to encode a binary bit "0", the pixel value of GP(s) needs to be changed so that the associated cell contrast is small, preferably the smallest possible. By keeping the pixel values of BPs unchanged, the distortion to the original visual image (with foreground image) can be minimized. In the second case, the pixel values of both GPs and BPs can be changed so that the resulting cell contrast is either large, representing binary bit "1", or small, representing binary bit "0". There are many known techniques in the art that can be used to accomplish such a change. One of the techniques is to change the pixel values of GP(s) and BPs proportionally so that the resulting cell contrast is either large or small. For example, if the pixel values of GP(s) and BPs are all equal to 100, one can increase the values of GP(s) by 50% and decrease the values of BPs by 50% so that CC will be changed from 0 to 100, representing binary bit "1". Likewise, if the values of GPs are 120 and the values of BPs are 80, one can decrease the values of GP(s) by 20%, and increase the values of BPs by 20% so that CC will change from 40 to 0, representing binary bit "0". For clarity, following illustration is focused on the first case (i.e. changing the values of GPs) only.

In implementation, knowing a cell's CW, one can embed binary bit "1" into the cell by setting GP(s) to a pixel value that is the "reverse" of the CW. Also, one can embed binary bit "0" into the cell by setting GP(s) to the value of the CW. Take a grayscale image for example, to embed binary bit "1", if the CW is large (gray to white), then the GP(s) are set to small (gray to black), preferably, the smallest possible (black). If the CW is small (gray to black), then GP(s) are set to large (gray to white), preferably, the largest possible (white). On the other hand, GP(s) can be set to the value of CW to embed binary bit "0". It is to be understood that the choice of representation of "1" by a high contrast and a "0" by a low contrast is arbitrary. One can easily do the representation with the reverse.

In a similar way, the technique of embedding binary bits into a grayscale image can also be done in color images. i.e., one that contains a plurality of colors (e.g., using pixels of three color components (yellow, cyan, magenta)). There are two cases in embedding binary bit "1" in color images. In the first case, all GPs will have one color, for example yellow. Similar to grayscale images, one can compute cell weight and cell contrast in color yellow as follows.

$$CW(\text{yellow}) = (BP_1(\text{yellow}) + BP_2(\text{yellow}) + \ldots + BP_n(\text{yellow}))/n$$

$$CC(\text{yellow}) = (GP_1(\text{yellow}) + GP_2(\text{yellow}) + \ldots + GP_m(\text{yellow}))/m - CW(\text{yellow})$$

Where $BP_1(\text{yellow})$ to $BP_n(\text{yellow})$ are the yellow color components of BPs; $GP_1(\text{yellow})$ to $GP_m(\text{yellow})$ are the yellow color components of GPs; and CW(yellow) is the yellow color component of cell weight, which is the average "yellowness" of the BPs; and CC(yellow) is the yellow color component of cell contrast. In a composite color image, there are many colors made of three primary color components such as yellow, cyan, and magenta. For example, tiny color dots of yellow, cyan and magenta can be used to give the appearance of various colors to an observer. In the above example, the other color components, cyan and magenta are simply ignored in the equation. To embed binary bit "1", one can adjust the values of GPs to render high cell contrast in yellow color component, i.e. maximizing CC(yellow). To embed binary bit "0", one can adjust the values of GPs to render low/no cell contrast in yellow color component, i.e. minimizing CC(yellow). In particular, to embed binary bit "1", if the CW(yellow) is small, one can set GPs to pure yellow (i.e. the yellow component is maximized, and other components such as cyan and magenta are set to 0) to render a high cell contrast in yellow color component. If the CW(yellow) is large, one can set GPs to zero to also render a high cell contrast in yellow. To embed binary bit "0", one can simply set the values of GPs to the value of CW(yellow) to render no cell contrast in yellow color component.

It is noted that human eyes are relatively insensitive to color yellow, therefore using color yellow as glyph color would minimize distortions to data embedded images for human perception. It is also noted that other colors such as ultra violet or infra red which are nearly invisible to naked eyes can also be used to embed data into images to reduce visual distortion to print contents. In such cases, a light source that can generate such ultra violet or infra red color can be used to illuminate the pixels patterns so that the printed pixels can be read.

In the second case of color images, GPs may have different colors from one cell to another cell. For clarity, cells with a single GP and three color components (yellow, cyan, magenta) are used in the following illustration. Similar to the first case, one can compute cell weight and cell contrast in colors as follows.

$$CW(\text{yellow}) = (BP_1(\text{yellow}) + BP_2(\text{yellow}) + \ldots + BP_n(\text{yellow}))/n$$

$$CW(\text{cyan}) = (BP_1(\text{cyan}) + BP_2(\text{cyan}) + \ldots + BP_n(\text{cyan}))/n$$

$$CW(\text{magenta}) = (BP_1(\text{magenta}) + BP_2(\text{magenta}) + \ldots + BP_n(\text{magenta}))/n$$

$$CC(\text{yellow}) = ABS(GP(\text{yellow}) - CW(\text{yellow}))$$

$$CC(\text{cyan}) = ABS(GP(\text{cyan}) - CW(\text{cyan}))$$

$$CC(\text{magenta}) = ABS(GP(\text{magenta}) - CW(\text{magenta}))$$

$$CC = SQRT(CC(\text{yellow})^2 + CC(\text{cyan})^2 + CC(\text{magenta})^2),$$

where GP(yellow), GP(cyan) and GP(magenta) are the values of a GP in yellow, cyan and magenta; CW(yellow), CW(cyan) and CW(magenta) are the values of the cell weight in yellow, cyan and magenta; CC(yellow), CC(cyan) and CC(magenta) are the values of the cell contrast in yellow, cyan and magenta. The superscript "2" indicates the power of two. The "ABS" means an absolute function. The "SQRT" means a square root function. To embed binary bit "1", one can vary the value of the GP(yellow), GP(cyan) and GP(magenta) to render a high cell contrast CC. To embed binary bit "0", one can simply set GP(yellow), GP(cyan) and GP(magenta) to the value of CW(yellow), CW(cyan) and CW(magenta) respectively.

Figure 9A:
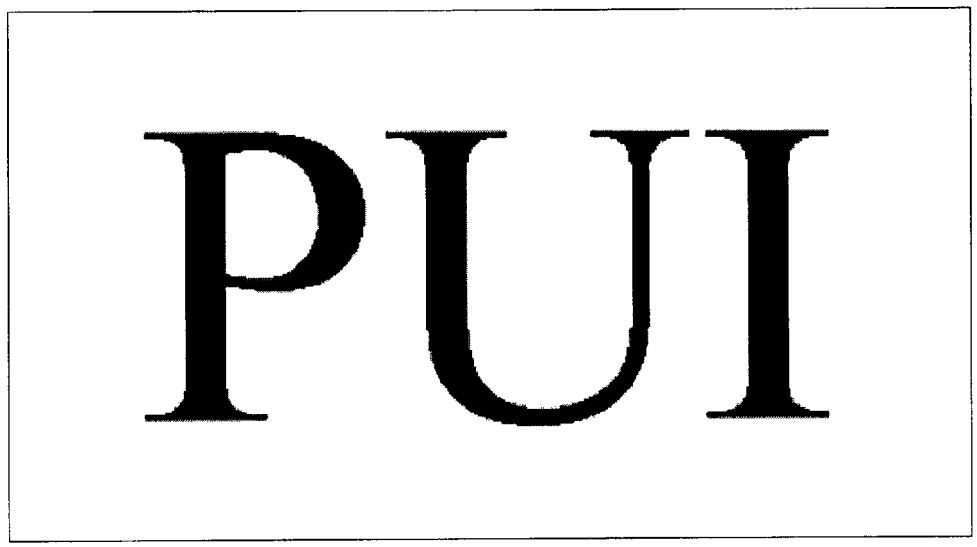
FIG. 9A shows a visual image before data embedding.
Figure 9B:
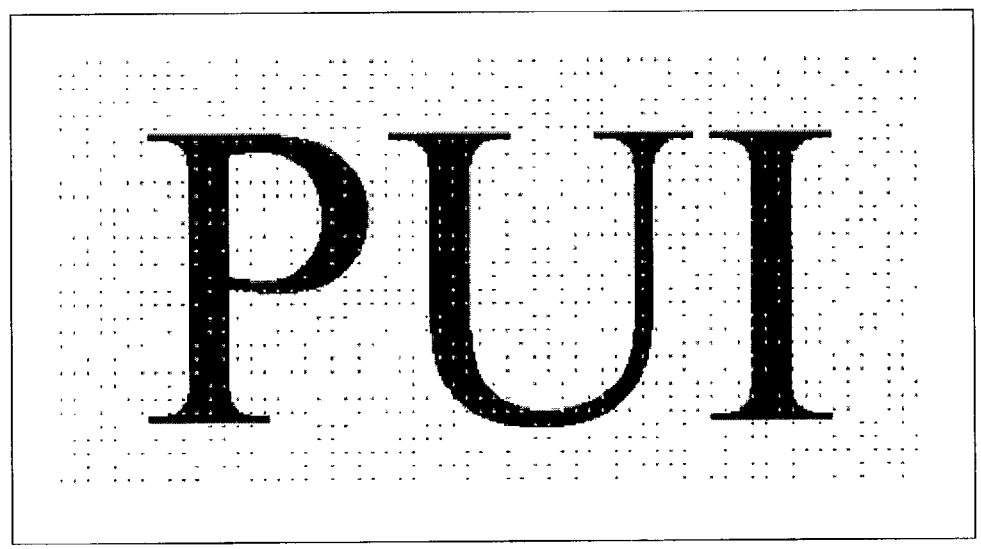
FIG. 9B shows the visual image of FIG. 9A after data embedding using tiles 300 of FIG. 3 and cells 400 of FIG. 4A.
Figure 9C:
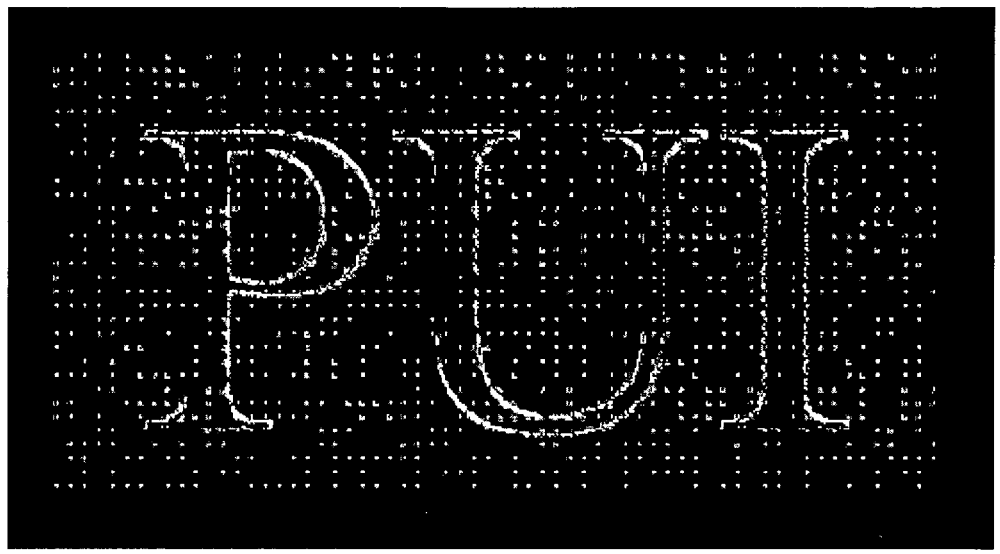
FIG. 9C shows a Glyph Map derived from FIG. 9B.
Figure 9D:
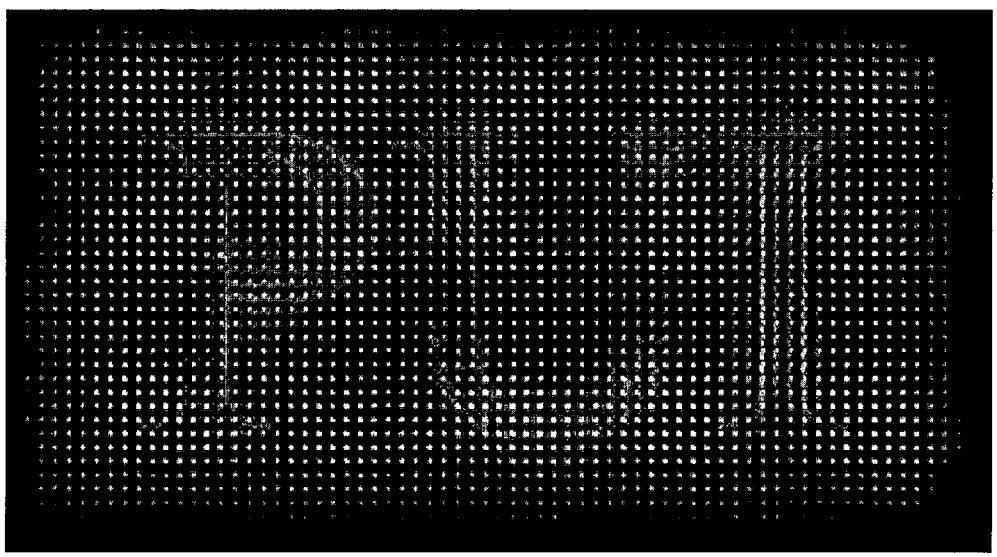
FIG. 9D shows a Grid Map derived from FIG. 9B and FIG. 9E.
Figure 9E:
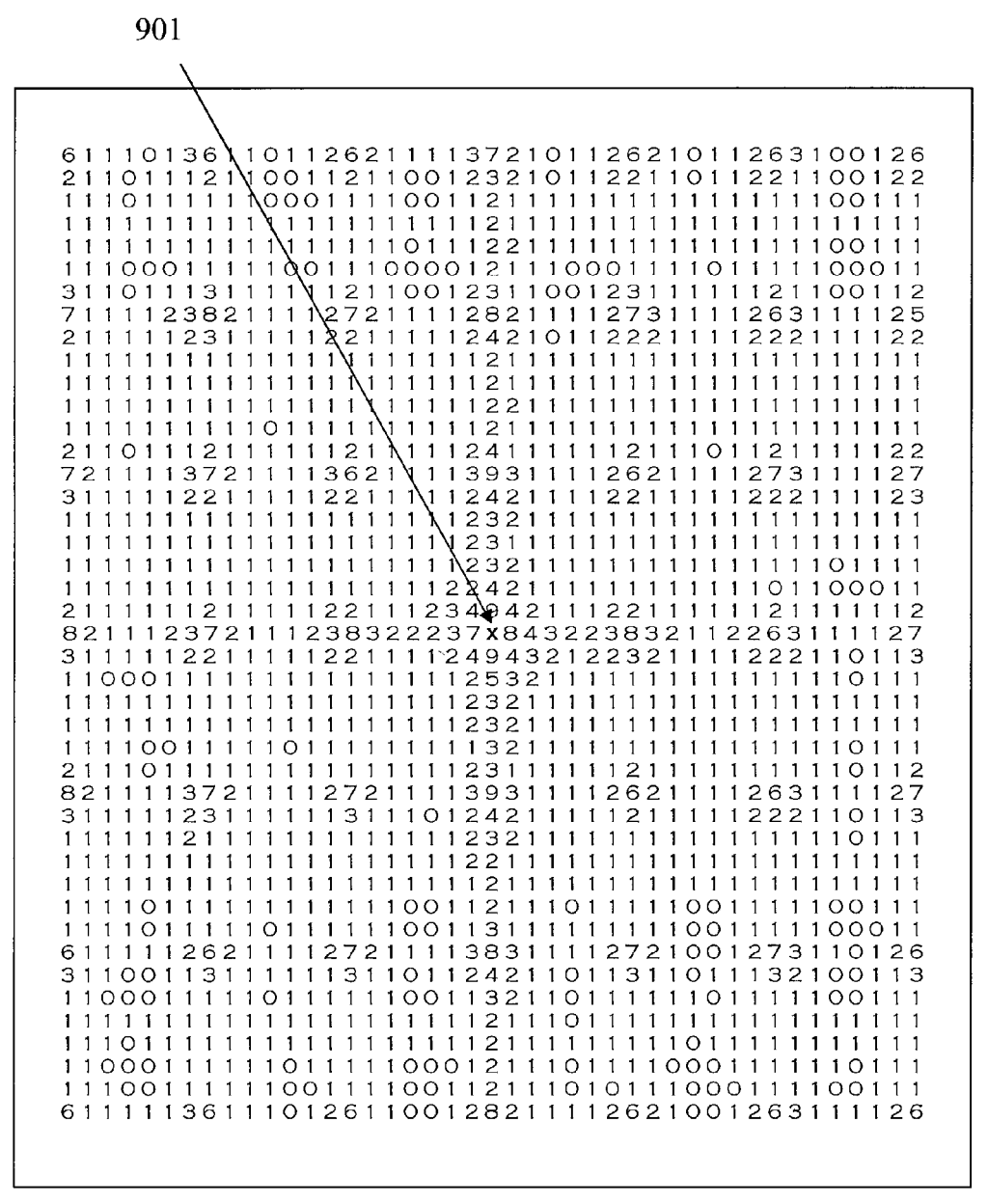
Figure 9F:
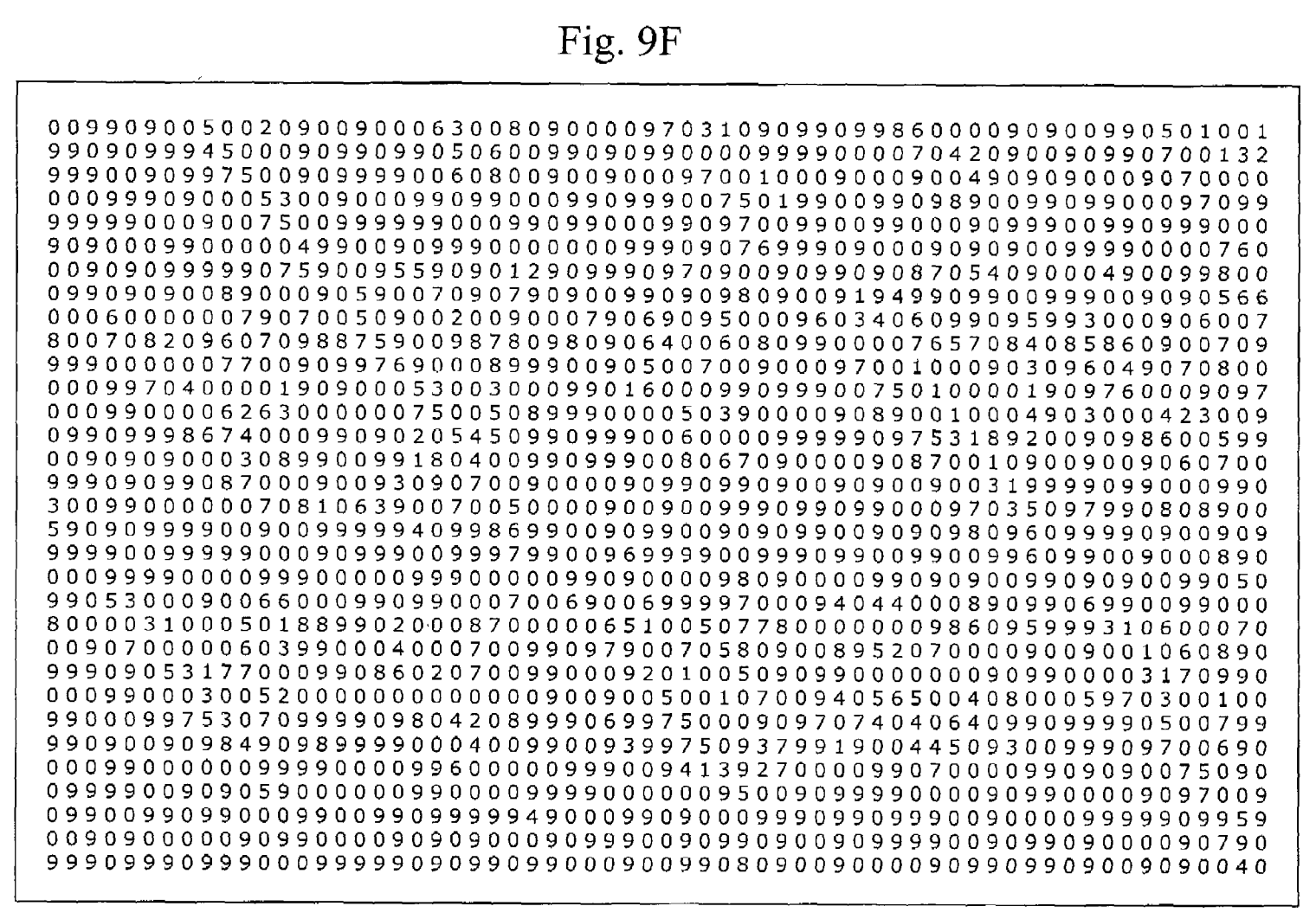
Figure 9G:
FIG. 9G shows a visual image before data embedding.
Figure 9H:
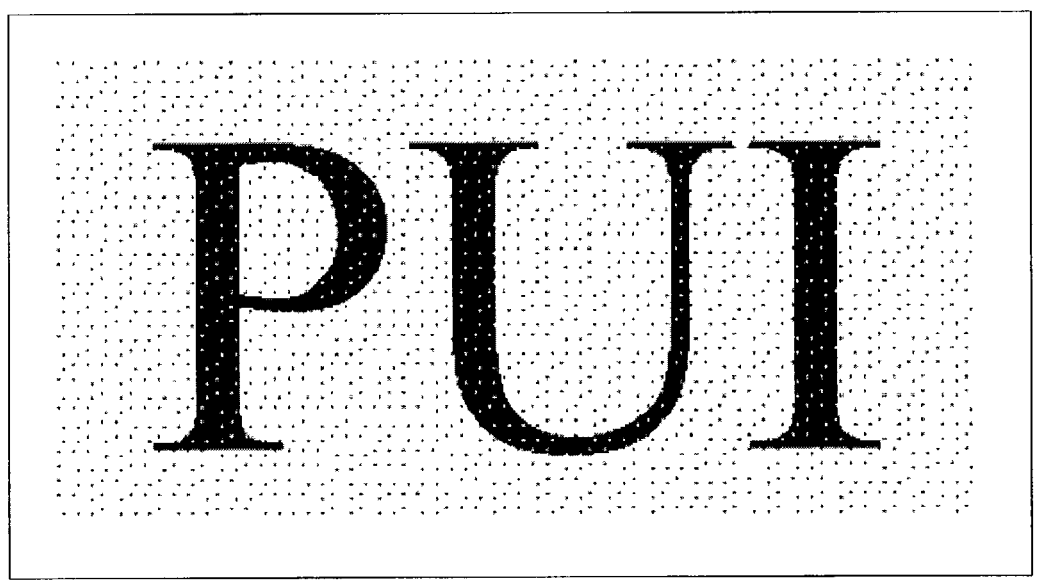
FIG. 9H shows the visual image of FIG. 9G after data embedding using tiles 300 of FIG. 3 and cells 404 of FIG. 4B.
Figure 9I:
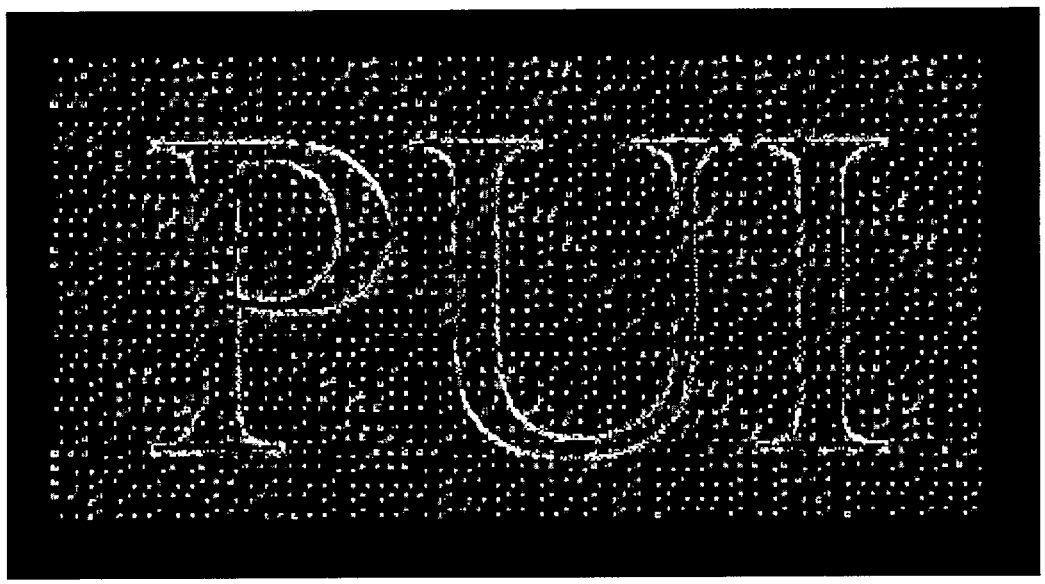
FIG. 9I shows a Glyph Map derived from FIG. 9H.
Figure 9J:
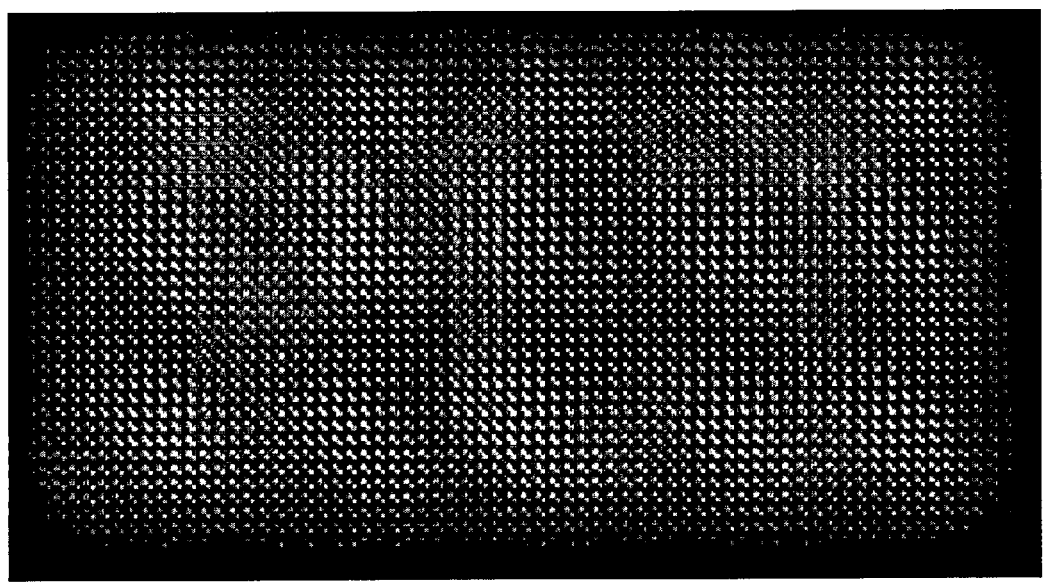
FIG. 9J shows a Grid Map derived from FIG. 9I and FIG. 9K.
Figure 9K:
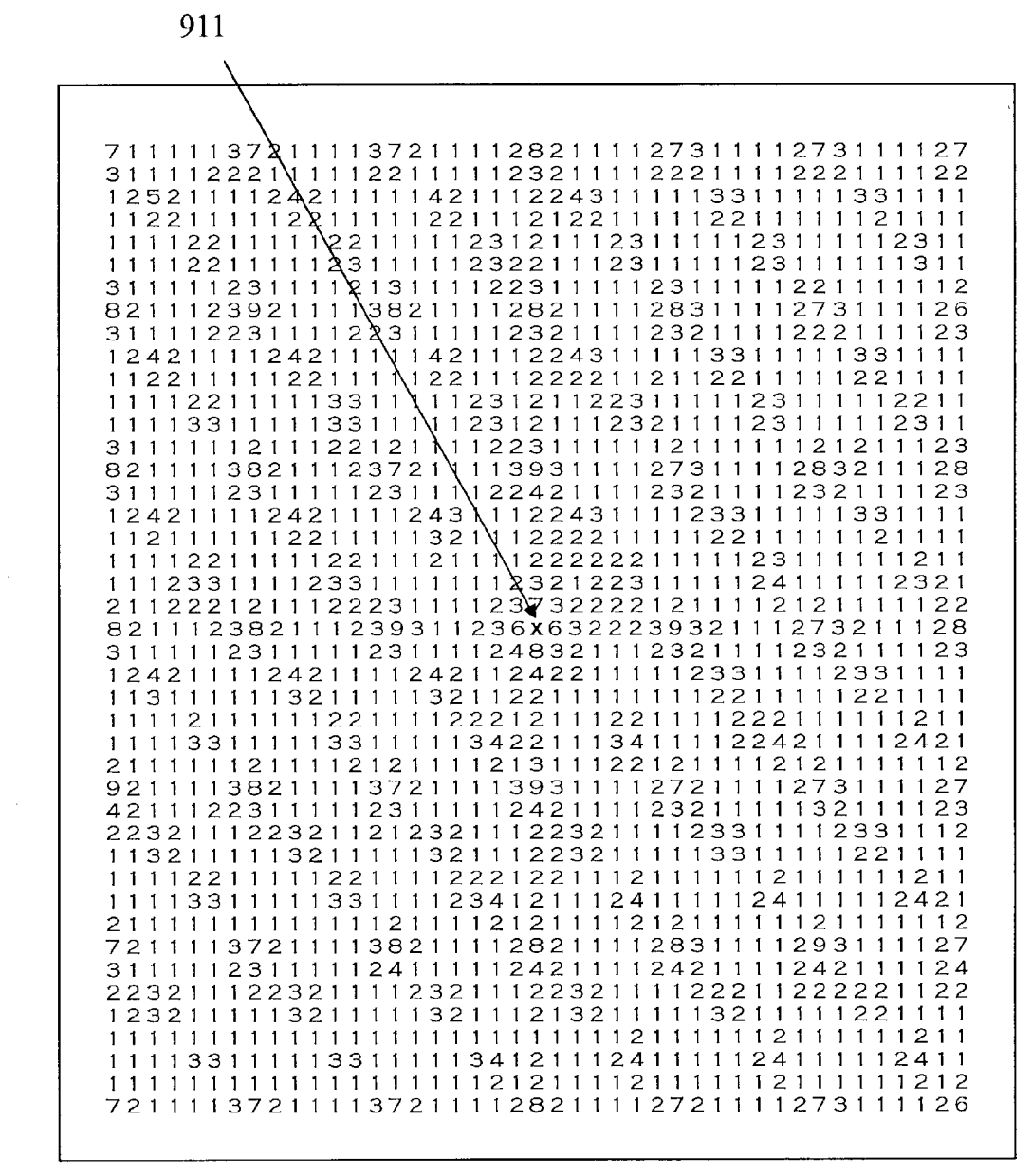
Figure 10A:
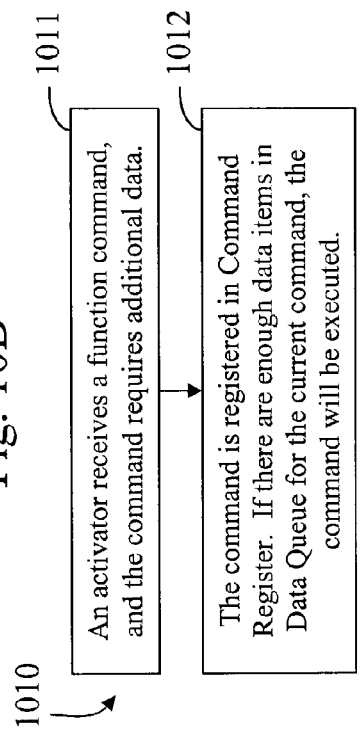
FIG. 10A to FIG. 10D show embodiments of processes taking place inside a handheld device of the present invention.
Figure 10B:
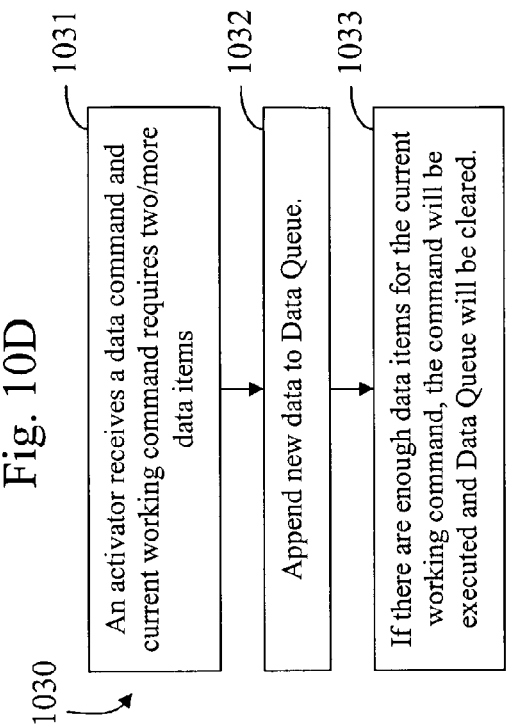
Figure 10C:
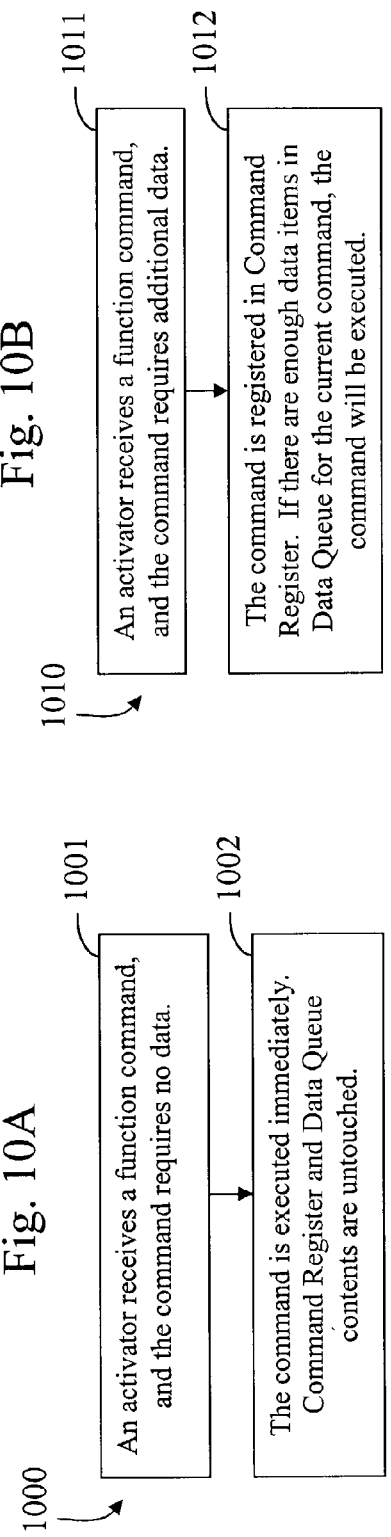
Figure 10D:
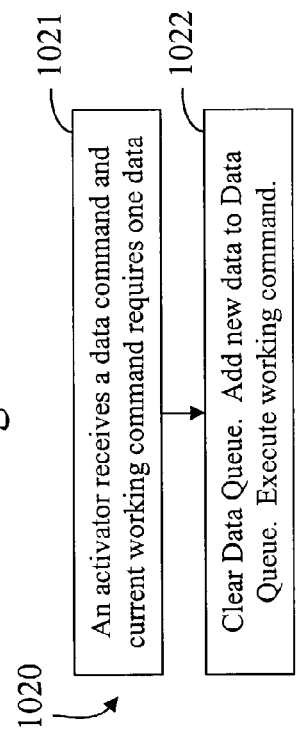

In general, one GP can be used to embed one binary bit or a fraction of a binary bit into a cell. FIGS. 4A and 4B show two 5×5 HyperCode cells 400 and 404. In cell 400, there is only one GP 402, therefore only one binary bit can be embedded. In cell 404, there are two GPs 406 and 407. One can choose to embed either one or two binary bits into the cell. When embedding two binary bits, GPs 406 and 407 are independent of each other, each having its own CC and bit value. Alternatively, the two GPs can be used collectively to embed a single binary bit into the cell. A special case of that is to have two GPs always take the opposite value of each other. For example, to embed binary bit "0", one can set GP1 to the value of CW, making CC for GP1 low. At the same time, one also set the value of GP0 to the "opposite" of CW, (i.e. setting GP0 to the largest value possible if CW is small, or setting it to the smallest value possible if CW is large), making CC for GP0 high. Similarly, in an alternative way, to embed binary bit "1", one can make CC for GP0 low and CC for GP1 high. This way, the glyph pixels GP0 and GP1 will always take the "opposite" value of each other. FIG. 9B shows a real life example of a data embedded image using HyperCode cells 400, wherein the pixel pattern contains data. FIG. 9H shows an example of a data embedded image using HyperCode cell 404 with GP0 and GP1 take opposite values of each other.

Encoding and Embedding a HyperCode Map

Figure 5:
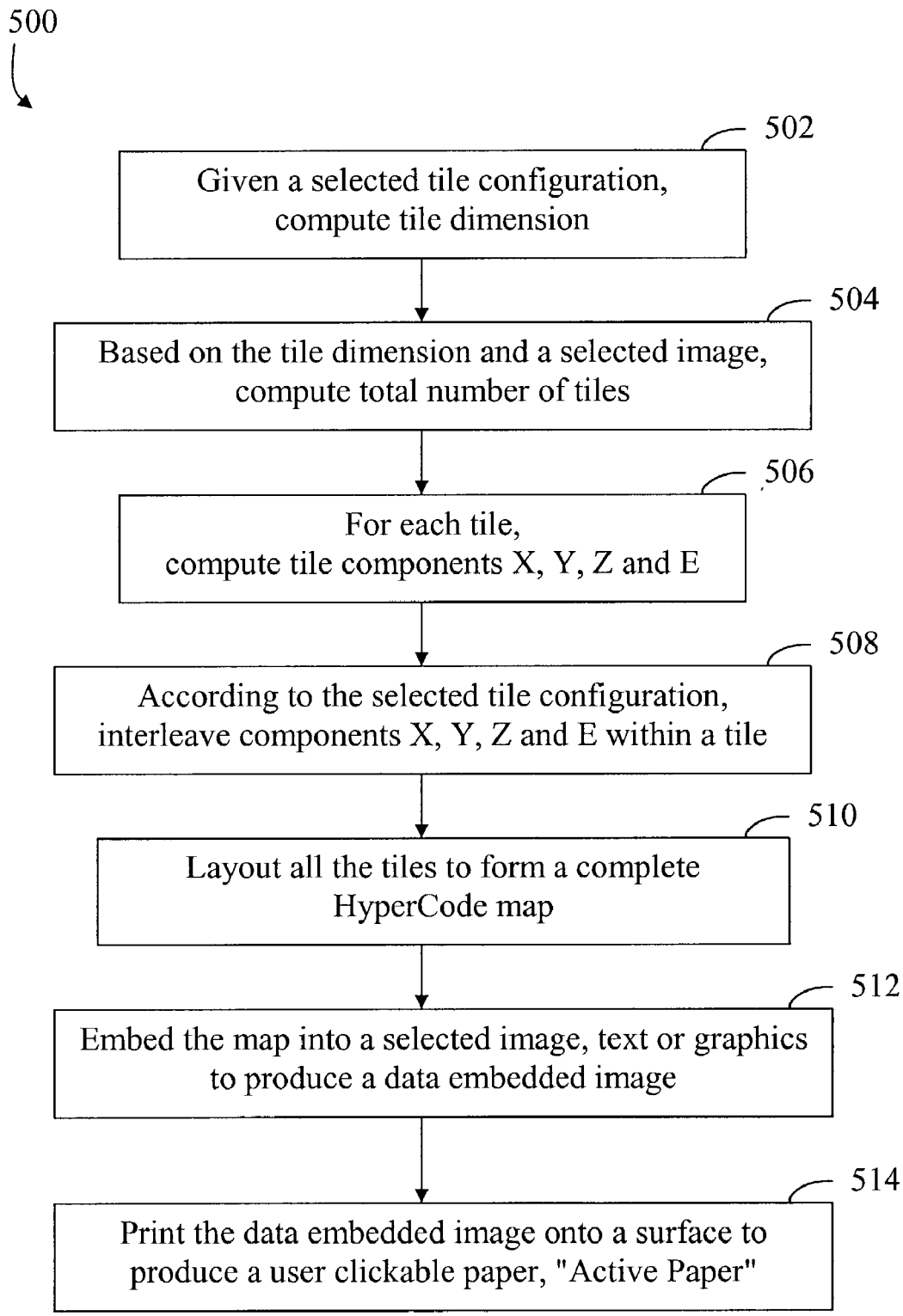
FIG. 5 shows an embodiment of a process of creating a HyperCode Map and embedding the HyperCode Map into a visual image.

FIG. 5 is a flow scheme showing an embodiment of how a HyperCode map can be encoded and embedded. In this embodiment, the tile will have information similar to the tiles shown in FIG. 3. It is noted that different information may be encoded, depending on the application chosen (e.g., whether it is an active print book, map, keyboard, etc.). First, a tile configuration for displaying the picture, photograph, graphics and text (or the "visual" or "image" desired for viewing) is selected and the dimensions of the tile array are selected (step 502). The selection will depend on the visual desired and the amount of information to be embedded. Based on the tile dimensions and the selected image, the total number of tiles is computed (step 504). For each tile, the tile components X, Y, Z, E are computed (step 506). Based on the selected tile configuration, components X, Y, Z and E are interleaved within a tile. In other words, the locations of the cells for the Xs, Ys, Zs and Es are selected to be spaced at a particular pattern for efficient retrieval without significant error. The tiles are laid out to form a complete HyperCode map (steps 508, 510). The HyperCode map, which contains logical 1s and 0s, are embedded in the selected image (which may include graphics, text, picture, photograph, etc.) to produce a data embedded image (step 512). It is noted that the Chang (U.S. Pat. No. 6,256,398) techniques of embedding binary bits 1s and 0s for a message within graphics and text can be used to implement the above data encoding and embedding. The data embedded graphics and text is printed onto a surface (e.g. paper) to produce a PUI. FIG. 9A shows an image of "PUI" before data embedding. FIG. 9B shows the image of "PUI" after data embedding using HyperCode cell 400 shown in FIG. 4A. FIG. 9H shows the image of "PUI" after data embedding using HyperCode cell 404 shown in FIG. 4B.

Decoding a Captured Image or a HyperCode Map

Figure 6:
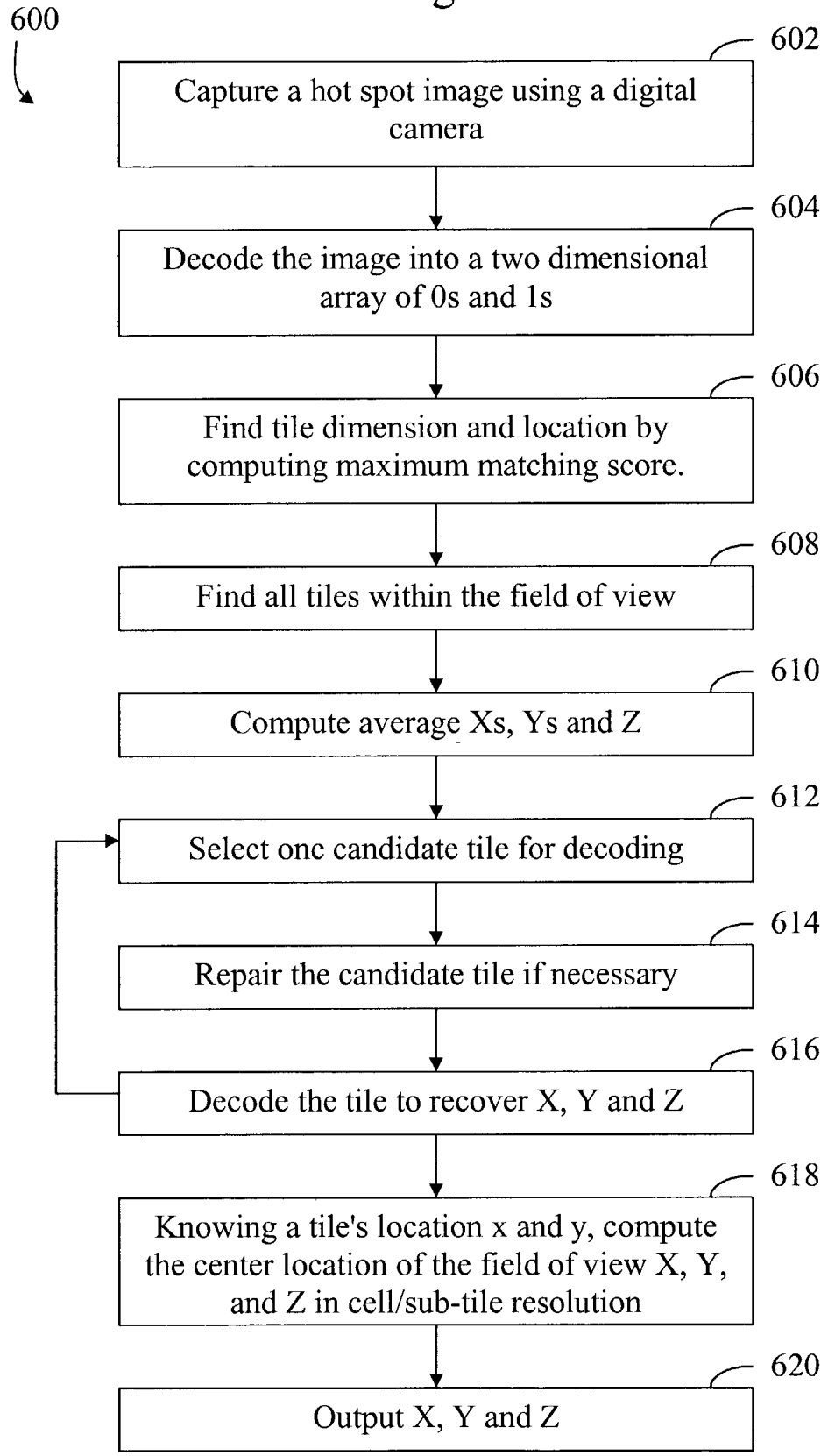
FIG. 6 shows an embodiment of a process of recovering embedded coordinates from a captured visual image.

The process of the embodiment shown in FIG. 6 for decoding a captured image or a HyperCode map embedded image starts with step 602. The process is similar to the process described by Chang in U.S. Pat. No. 6,256,398. In Step 602, a partial image of a HyperCode map (106 in FIG. 1) is captured using a digital camera when a hotspot in a PUI is either clicked on or touched. (The captured image will also be referred to as "field of view", or FOV). Step 604 transforms the captured image into a Data Map (FIG. 9F). A Data Map (FIG. 9F) is a 2D array of values with small value representing binary bit "0" and large value representing binary bit "1". (Note that the values in Data Map FIG. 9F are normalized between value 0 and 9, with 0 being the smallest value possible, and 9 the largest value possible.) The details of this transformation will be explained further below related to process 700 of FIG. 7. In general, all tiles within a HyperCode Map have the same Z components (Z1 to Z32, FIG. 3), all tiles in a horizontal row the same Y components (Y1 to Y8, FIG. 3), and all tiles in a vertical column the same X components (X1 to X8, FIG. 3). With these attributes, tile boundaries (dimension and location) can be picked out (step 606) from the Data Map (FIG. 9F) by correlating the components X, Y and Z. Computationwise, a point in the Data Map (FIG. 9F) is selected as a candidate tile boundary, and then the correlation score of X, Y and Z is computed. If the score is high, then the selected point is potentially a tile boundary. This step is repeated until all points in the Data Map (FIG. 9F) are exhausted. Subsequently, the correlation scores are examined, and high scores occur at true tile boundaries. Knowing tile boundaries, step 608 identifies all tiles within the field of view of the camera in the captured image. Step 610 averages Z1 to Z32 for all tiles within the field of view, and averages X1 to X8 for each tile row and averages Y1 to Y8 for each tile column. Step 612 selects one tile for decoding. Step 614 compares the bits in X, Y and Z of the selected tile with that of the averaged X, Y and Z. If any bit is different, then the bit is a potential error bit; and it can be "repaired" by replacing it with that of the averaged X, Y and Z. Step 616 decodes the selected tile by performing error correction on the selected tile. If the error correction fails, the operation goes back to step 612, and another candidate tile is selected. Steps 612 to 616 are repeated until either a tile is decoded successfully or the decoding process fails completely. From a recovered tile location (x, y, z), FOV-Center (X, Y, Z), i.e., the center location of the field of view of the captured image, can be calculated (FIG. 8). Note that coordinates x and y in FIG. 8 are in the units of tiles, and coordinates X and Y are in the units of cells. Therefore, the values of X, Y and Z are computed (step 618) as follows:

$$X = x*TW + DX$$

$$Y = y*TH + DY$$

$$Z = z,$$

where TW is tile width, TH is tile height, DX is the horizontal distance between x and X, and DY is the vertical distance between y and Y. TW, TH, DX and DY are in unit of cells.

Transforming a Data Embedded Image into a Data Map

Figure 7:
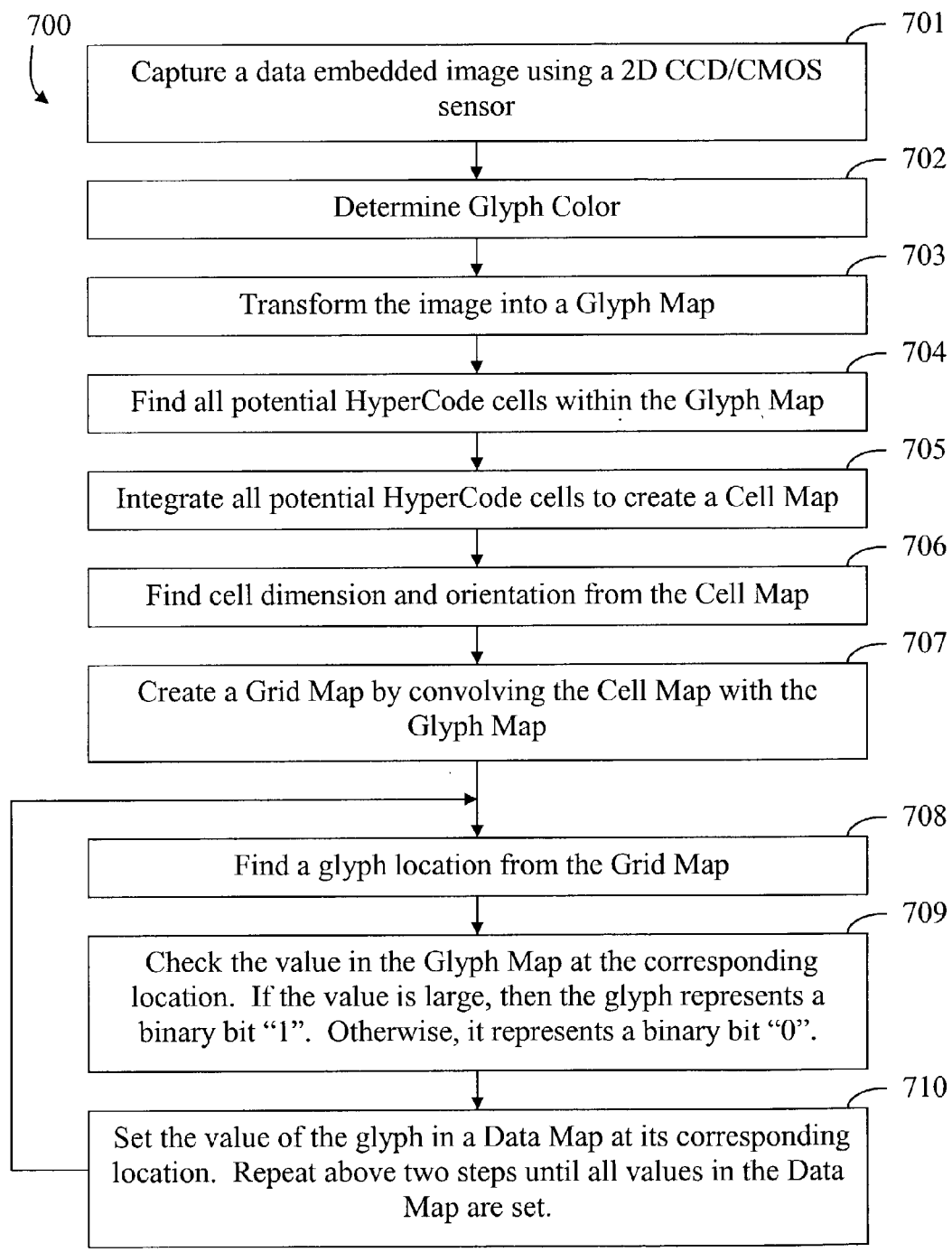
FIG. 7 shows an embodiment of a process of converting a two dimensional (2D) data embedded image into a 2D data map.

An embodiment of the process of transforming a data embedded image (FIG. 9B) into a Data Map (FIG. 9F) is depicted in FIG. 7. Some of the details can also be found in the Chang technique in U.S. Pat. No. 6,256,398. Briefly stated here, step 1 (701) of the process captures a data embedded image (FIG. 9B) from a print hotspot by an activator using a 2D CCD/CMOS sensor. Step 2 (702) detects glyph color from the image (i.e. the color of micro dots in the image of FIG. 9B). This task can be accomplished by a method of trial and error. First, a glyph color is assumed (black, yellow or any other colors). Then, the validity of the assumption is checked by computing the total number of glyphs in that color. If the number is large, the probability of glyphs in that color is high. After examining all the potential glyph colors, the one with the highest probability will be chosen as the true glyph color. Step 3 (703) transforms the data embedded image (FIG. 9B) into a Glyph Map (FIG. 9C) such that glyph locations can be easily identified. (Note that the values in Glyph Map FIG. 9C are shown as images with white representing the largest value possible and black the smallest value possible.) The transformation is done by computing the transformed pixel values from the measured pixel values via an equation. Conceptually, a transformed pixel value is a cell contrast (CC) which describes the difference between glyph pixel/pixels and background pixels within a HyperCode cell. Computationally, a CC is computed by taking the absolute difference between glyph pixel/pixels and the average of those pixels surrounding it/them, e.g., the absolute difference between a glyph pixel GP and its background pixels BPs. Cell contrasts CCs are calculated for all pixels within a captured image, including all potential GPs and BPs. For example, in the embodiment in which a GP is surrounded on all sides by eight background pixels, the CC is:

$$CC=ABS(GP-AVE(BPs))$$

$$AVE(BPs)=(BP1+BP2+BP3+BP4+BP6+BP7+BP8+BP9)/8,$$

where "ABS" means an absolute function, "AVE" means an average function, GP is the measured pixel value of the glyph pixel, BPs are the measured pixel values of the background pixels, (BP1, BP2, BP3, BP4, BP6, BP7, BP8, and BP9), immediately surrounding the GP. Cell contrasts CCs are landmarks for glyph locations. If CC value of a pixel is large, then the pixel is probably a GP with an embedded binary bit of "1". If CC value of a pixel is small, then the pixel could either be a GP with an embedded binary bit of "0", or a BP with no data embedded in it. Note that the pixel values are measured with respect to various colors. For grayscale images, pixel values are the measurements of pixels' brightness. For color images, pixel values are the measurements of pixels' brightness with respect to a chosen color. For example, if the glyph color detected in step 702 is yellow, then the above GP and BPs are measured pixels' brightness in color yellow, and other colors such as cyan and magenta are ignored. As such, a data embedded grayscale image is only a special case of data embedded color images with glyphs in the color black.

Alternatively, glyph pixels (GPs) can also be in different colors varying from one cell to another cell to render high cell contrasts (CCs). In this case, the value of CC is computed as follows.

$$CC=CC(\text{red})^2+CC(\text{green})^2+CC(\text{red})^2$$

$$CC(\text{red})=ABS(GP(\text{red})-AVE(BPs(\text{red})))$$

$$CC(\text{green})=ABS(GP(\text{green})-AVE(BPs(\text{green})))$$

$$CC(\text{blue})=ABS(GP(\text{blue})-AVE(BPs(\text{blue}))),$$

where the CC(red) is cell contrast in red, CC(green) the cell contrast in green and CC(blue) the cell contrast in blue. The superscript "2" indicates the power of two.

Step 704 identifies potential HyperCode cells within the Glyph Map (FIG. 9C). Since GPs are at the center of HyperCode cells, by finding the GPs, HyperCode cells can then be identified. A glyph pixel can be found by searching for local maximum pixels in the Glyph Map (FIG. 9C). A "local maximum" pixel is a pixel whose pixel value is greater than or equal to (>=) the pixel values of all adjoining pixels in any matrix of pixels. After finding a glyph pixel (GP), a HyperCode cell can be identified by selecting a local window centered on the glyph pixel. A "local window" is a window of w by w pixels with a local maximum pixel in the center of each window. The dimension of the local window should be large enough to cover a number of cells. For example, a w value of {w=3×(maximum cell size)+1} can be used; and if one assumes the maximum size of a cell is 6×6 pixels, then w=3×6+1=19. All local maximum pixels should have a local window.

Step 705 creates a Cell Map (FIG. 9E) by accumulating all potential HyperCode cells in a Glyph Map. (Note that in this embodiment, the values in Cell Map FIG. 9E are normalized between value 0 and 9, with 0 being the smallest value, and 9 the largest value.) In practice, one can compute a two dimensional histogram of size w by w, e.g., a 20×20 histogram, by stacking (i.e., summing) all pixels values of all local windows. After all window values are accumulated, the histogram becomes the Cell Map (e.g., FIG. 9E is an example of a Cell Map derived from the Glyph Map of FIG. 9B) showing the accumulated pixel values around the neighborhood of the local maximum pixel marked by "x" (901, FIG. 9E).

Step 706 finds cell dimension and orientation from the Cell Map (FIG. 9E) by computing a maximum matching score. Assuming cell dimension is designated by a variable D and orientation a variable A, a temporary Cell Map of dimension D and orientation A can be created. Matching the temporary Cell Map with the Cell Map derived from the captured image, a matching score can be computed. Varying the variables D and A, one can find a maximum matching score, with which the associated cell dimension and orientation are used as the true cell dimension and orientation. D and A can be varied by trial and error from a value of, for example, D from 3 to 10 and A from −45 degrees to 45 degrees. It is noted other ranges of variation can also be tried. For example, with the Cell Map FIG. 9E, the matching score is maximized when cell dimension D=7 pixels and cell orientation A=0 degrees. Therefore the associated cell dimension of 7 pixels and orientation of 0 degrees are used in subsequent operations. It is worth noting that above method can also be used to compute cell dimension and orientation for HyperCode cells with multiple glyph pixels such as cell 404 in FIG. 4B.

Step 707 creates a Grid Map (FIG. 9D) by doing a 2D convolution of the Cell Map (FIG. 9E) with the Glyph Map (FIG. 9C). (Note that the values in Grid Map FIG. 9D are shown as images with white representing the largest value possible and black the smallest value possible.) The computational steps of a 2D convolution are well known in the art. The basic idea is to use the Cell Map as a template and extend it over the Glyph Map to pin down the locations of all glyph pixels (GPs) within an image.

Knowing the glyph's dimension, orientation and location, steps 708, 709 and 710 decode the Glyph Map (FIG. 9C) with the help of Grid Map (FIG. 9D) into a Data Map FIG. 9F, which was described earlier. In this process, one can locate a glyph from the Grid Map, then check the pixel value in the Glyph Map at its corresponding location. If the pixel value is large, then the glyph represents an embedded binary bit "1", otherwise the glyph represents an embedded binary bit "0". With the embedded value known, one can set it in the Data Map (FIG. 9F) at its corresponding location. The above steps are repeated until all values in the Data Map are set.

In the above illustration, FIGS. 9B to 9F depict intermediate results of process 700 of FIG. 7. Note that the hotspot (e.g., as in FIG. 9B) is an image with embedded cells of a single GP in a cell (as in cell 400 in FIG. 4A). This is just an illustration and not a limitation. In fact the same process 700, FIG. 7 can also be applied to images with embedded cells of multiple GPs. For example, FIG. 9H shows an image with embedded cells of two GPs per cell (as in cell 404 in FIG. 4B). FIGS. 9I to 9L depict the intermediate results of the process 700 applied to the hotspot of FIG. 9H.

Figure 9L:
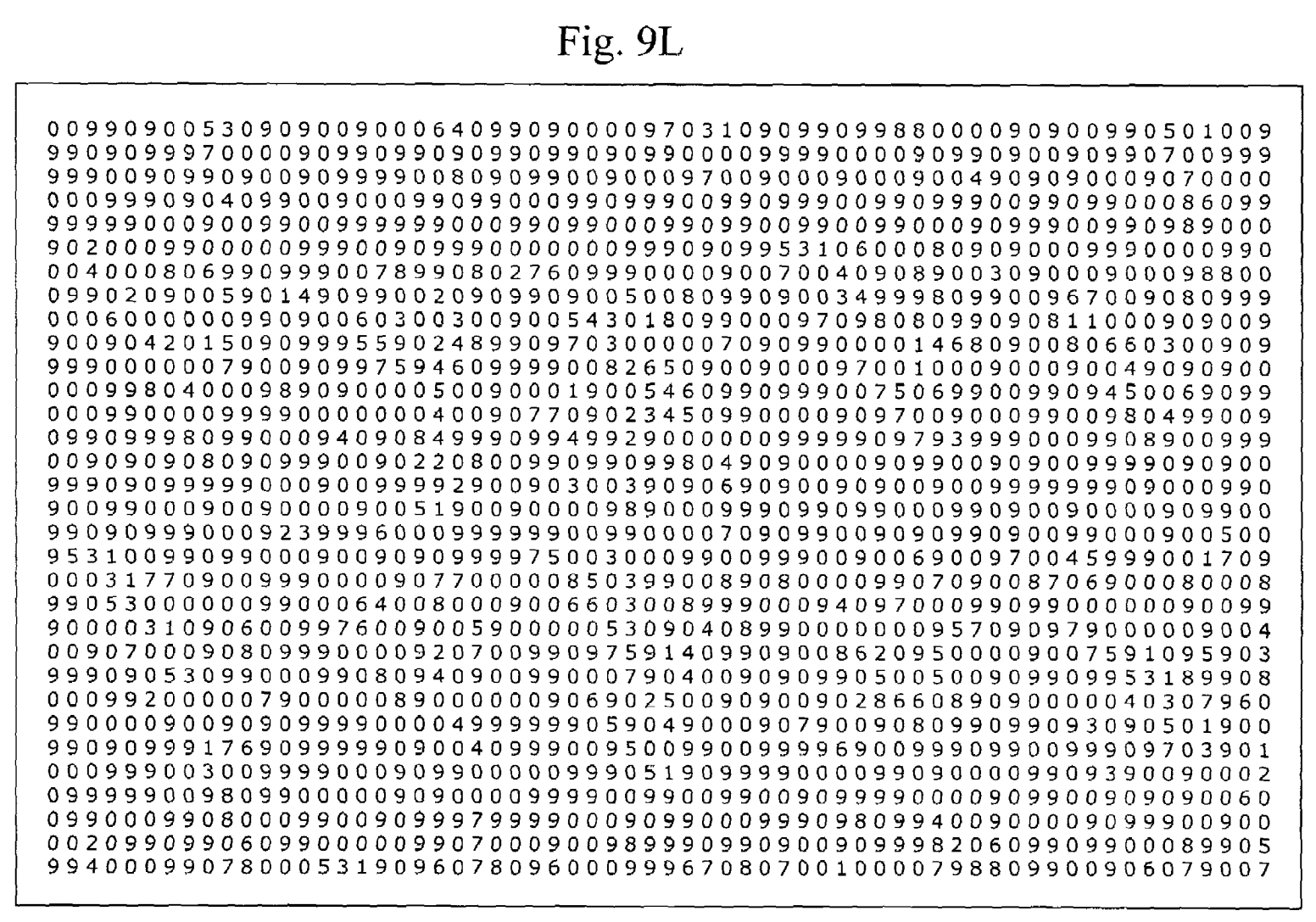

It is worth noting that other methods can also be used to transform a Glyph Map (FIG. 9C or 9I) into a Data Map (FIG. 9F or 9L). For example, one can construct a virtual Glyph Map with cell dimension D and cell orientation A as parameters. Varying the parameters D and A, one will get a different virtual Glyph Map. Matching the virtual Glyph Map with the Glyph Map derived from a captured image, one will get a matching score. When the matching score is maximized, the associated parameters D and A will approach to its true values. With parameters D and A known, one can construct a virtual Grid Map similar to the one shown in FIG. 9D or 9J. With the constructed virtual Grid Map, steps 708, 709 and 710 can be used to decode a Glyph Map (FIG. 9C or 9I) into a Data Map (FIG. 9F or 9L).

Activation Box & Activator Command

A hotspot on a print surface is defined using a bounding box called an "activation box". In an embodiment, an activation box has five parameters, x1, y1, x2, y2 and z, where parameters x1 and y1 define the upper left corner of the box, parameters x2 and y2 the lower right corner of the box, and parameter z a map ID. When a hotspot is defined, its associated activation box (x1, y1, x2, y2, z) is created.

A hotspot is also associated with an activator command, which can be a "function command", or a "data command". For example, "IncreaseSpeakerVolume( )", a function to increase speaker's volume, will be executed when the associated hotspot is being activated, or clicked on. In general, when an FOV-Center (X, Y, Z) (i.e., center of a "field of view" when an image is captured) meets the following conditions:

$$Z=z$$

$$X>x1 \text{ and } X<x2$$

$$Y>y1 \text{ and } Y<y2,$$

(where > means larger than and < means smaller than) the associated command will be invoked. In the cases where two or more hotspots are captured in the same snapshot (or FOV) by an activator, the hotspot nearest to the FOV-Center (X, Y, Z) will be chosen as the intended hotspot. (Other criteria can be used as well.) The distance from a hotspot to an FOV-Center (X, Y, Z) is computed as follows:

$$ox=(x2+x1)/2$$

$$oy=(y2+y1)/2$$

$$DIST=SQRT((X-ox)^2+(Y-oy)^2),$$

where the point (ox, oy) is the coordinate location of the center of each hotspot, x1, y1, x2, y2 give the coordinates of the activation box for the particular hotspot, SQRT is a square root function, and DIST is the distance from the center of the hotspot to the FOV-Center.

The Action Table

An Action Table of the present invention maps hotspots on print surfaces to actions. An Action Table contains many entries. In an embodiment, each entry is composed of an activation box, a function/data command, and some optional parameters. When a hotspot is captured (by a click or a tap with an activator), the FOV-Center (X, Y, Z) is computed, and is compared with activation boxes (x1, y1, x2, y2, z) in the action table entries. When the FOV-Center (X, Y, Z) falls within the boundaries of any given activation box, the box is picked out. If more than one activation box is picked out, the one nearest to the FOV-Center is selected as the intended hotspot, and its associated command in the entry will be executed. For example, an entry in the Action Table may contain the following entry:

Activation Box=[x1=10, x2=30, y1=20, y2=40, z=7777777]

Activator Command=[IncreaseSpeakerVolume( )]

Operational Parameters=[null]

Suppose the FOV-Center (X=20, Y=30, Z=7777777) is computed, the activation conditions are met (i.e. X>x1, X<x2, Y>y1, Y<y2, and Z=z), and the associated hotspot is considered a possible intended hotspot. If it is the only hotspot in the FOV or it is decided to be the nearest hotspot to the FOV-Center, the activator command i.e. "IncreaseSpeakerVolume( )", will be taken. Subsequently, the activator's speaker volume is increased. If it turns out that the volume is still too low, or is now too high, the user can click the activator to adjust accordingly, for example, by clicking on a button which includes the function "DecreaseSpeakerVolume( )". Thus, this is another example of interactive operation of a device of the present invention.

The action table may reside inside an activator, or on a networked computer server. The above described comparison process may take place inside an activator or remotely on a networked server.

Single and Multiple Click Actions

Some activator operations, such as "IncreaseSpeakerVolume( )", a function to increase speaker volume, require just a single click on a function hotspot. Some other operations, such as "FindHotelsNear(xyz)", a function of finding hotels near some location xyz, may involve maximum two activator clicks on two different hotspots. Still others, such as "FindDirectionsBetween(a, b)", a function of finding directions for going from point a to point b, may need a maximum of three clicks before the operation can be completed. Because in such embodiments multiple clicks or taps are needed to launch one desired function, such operations can be considered interactive. The success of the second click or tap depends on whether the first click or tap is done properly. Additionally, the device can display a feedback message to notify the user that the first click successfully launches the first step of the multiple step function so the user can progress to the second. Otherwise the user might want to redo the first click. In certain cases, the activator can be made to emit a signal (such as a "beep" sound) to the user to indicate the successful completion of the first step to prompt the user to progress to the second step, and so forth.

For example, in the case of Active Print Map (FIG. 19, which will be described later), the operation of finding hotels near some street location requires two activator clicks. The first click is on button "Hotels" (1903), and the second click on an intended street location, such as the intersection of "Market Street" and "12th St." (1902). After the second click, the operation of finding hotels near the intersection of "Market Street" and "12th St." can be completed. The button "Hotels" (1903) is associated with an activator function such as "FindHotelsNear(xyz)", and the map area (1902) is associated with the parameter xyz. At the first click on button "Hotels" (1903), the function "FindHotelsNear(xyz)" is registered, but the parameter xyz would have no value. At the second step, by a second click in the map area, the parameter xyz will take the output (X, Y, Z) from an activator as its value, and the operation of finding hotels near location (X, Y) on map Z can be completed. Likewise, the button "Find Directions" is associated with a function, such as "FindDirectionsBetween(a, b)". At the first click on the button, the function "FindDirectionBetween(a, b)" is registered. At the second click in the map area, the parameter "a" would have a value. At the third click in the map area, the parameter "b" would have a value too. Afterwards, the operation of finding directions can be completed between points "a" and "b" on map "Z". Generally, the primary function of a map is to show the user the street layout. However, information that is related to hotels, restaurants, theaters, grocery stores, banks, gas stations, and the like, although being secondary to the information about streets, are nonetheless very useful to people who are not familiar with the community, such as visitors, tourists, and new comers to community.

Other multiple click operations can also be used in the various application mentioned in this disclosure. For example, in a children's book, there can be multiple buttons associated with a subject. For example, one can click on the button on "sound" and then on the picture of "elephant" to hear the sound of an elephant. It is contemplated that multiple buttons on various functions can be associated with packaging of medicine, as well as on a paper keyboard (e.g., the "shift" key and the key for the letters). Further, there can be buttons that control the mechanics of the display of the information. The mechanics are the characteristics of the display rather than the substantive information that the observer/user is seeking. For example, there can be buttons for controlling the mechanics such as "stop", "pause", "forward", "backward" similar to those found in a tape recorder or video recorder/viewer to control the direction of the display. There can also be buttons to control the volume of the sound, the color, the magnification, and the like.

Command Register, Data Queue and Control Flags

An activator of the present invention, which is used to launch a function, works in the following way. Generally, an activator's operating system includes one Command Register, one Data Queue and many Control Flags. A Command Register stores and remembers the current working command. A Data Queue stores and remembers the current working data. Control Flags direct an activator's mode of operations. There are two types of commands, function commands and data commands. For example, "IncreaseSpeakerVolume( )" is a function command which instructs an activator to increase its speaker volume. "AppendData (xyz)" is a data command which instructs an activator to append data "xyz" to its Data Queue. "NewData(xyz)" is a data command that instructs an activator to clear its Data Queue and then enter data "xyz" to the Data Queue.

Normally, an activator operates in several default modes when it receives either a function command or a data command. These default modes are depicted in FIGS. 10A–10D. When an activator receives a function command and the command requires no data (FIG. 10A, process 1000), the command is executed immediately. The contents of the Function Register and Data Queue are untouched. When an activator receives a function command and the command requires additional data (FIG. 10B, process 1010), the function command is registered in Command Register. Then if there are enough data items in the Data Queue for the current function command, the command will be executed. When an activator receives a data command and current working command requires one data item (FIG. 10C, process 1020), Data Queue will be cleared and the new data will be added to the Data Queue, and then the current working command will be executed. When an activator receives a data command and current working command requires two/more data items (FIG. 10D, process 1030), new data will be appended to Data Queue. Then if there are enough data items for the current working command, the command will be executed and Data Queue will be cleared.

Figure 19:
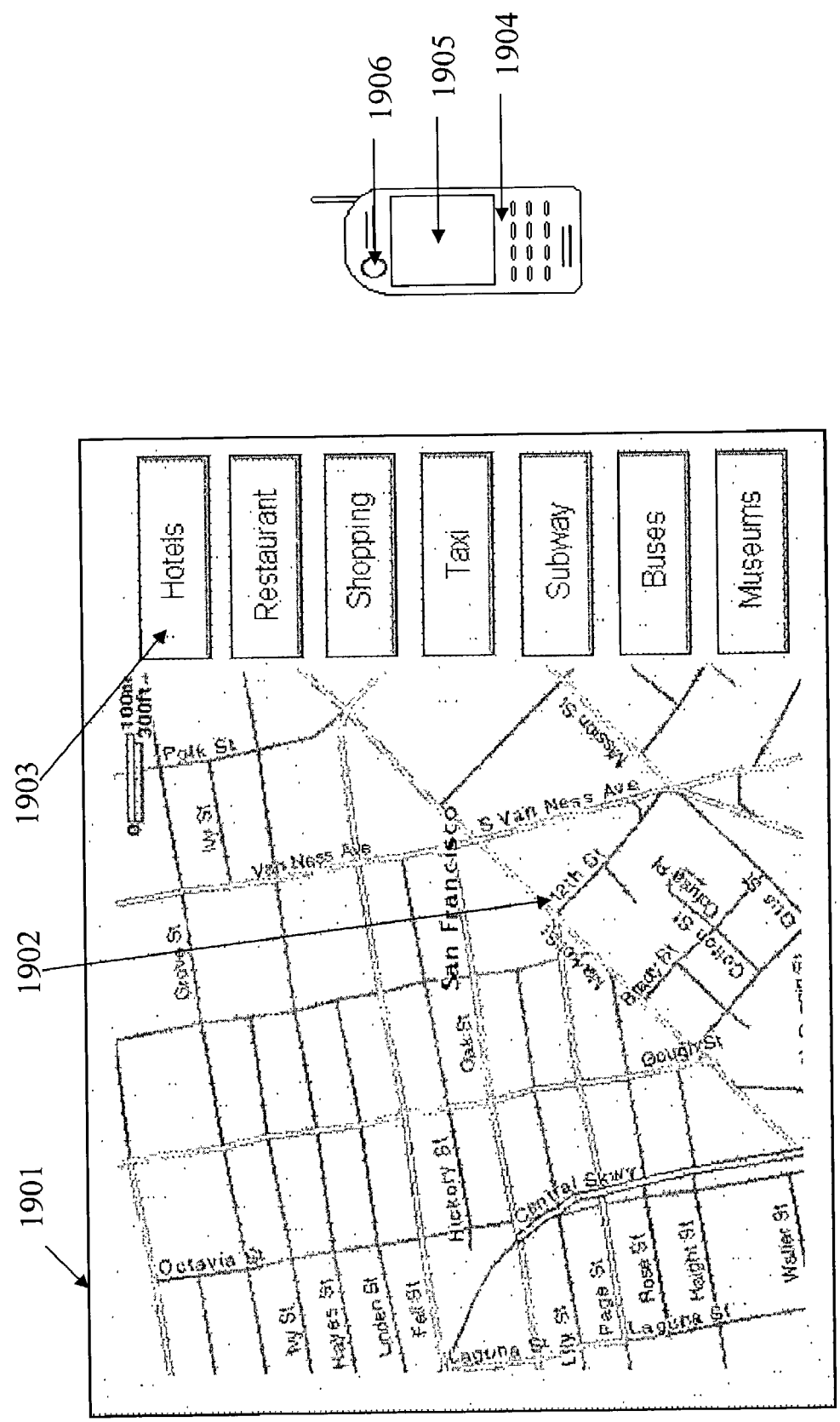
FIG. 19 shows an embodiment of an active print map application.

For example, the buttons in FIG. 19 are function commands, and the hotspots in the map area (such as 1902) are data commands. When button "Hotels" (1903) is clicked or tapped, the activator will receive a function command FindHotelsNear(xyz), the command will be registered in the Function Register. Subsequently, when the user clicks/taps in the map area (1902) again, the activator will receive a data command, and the new data will be queued in the Data Queue. Since there are enough data in the Data Queue for function FindHotelsNear(xyz) to be executed, the function will be executed. At this point, the Data Queue holds data "xyz", the Function Register still holds the function of FindHotelsNear(xyz), and the activator awaits data/command to come in.

The default modes of operation will be changed when Control Flags are specified. Control Flags are associated with each hotspot, and they are application dependent.

Active Print Book Application

Figure 11:
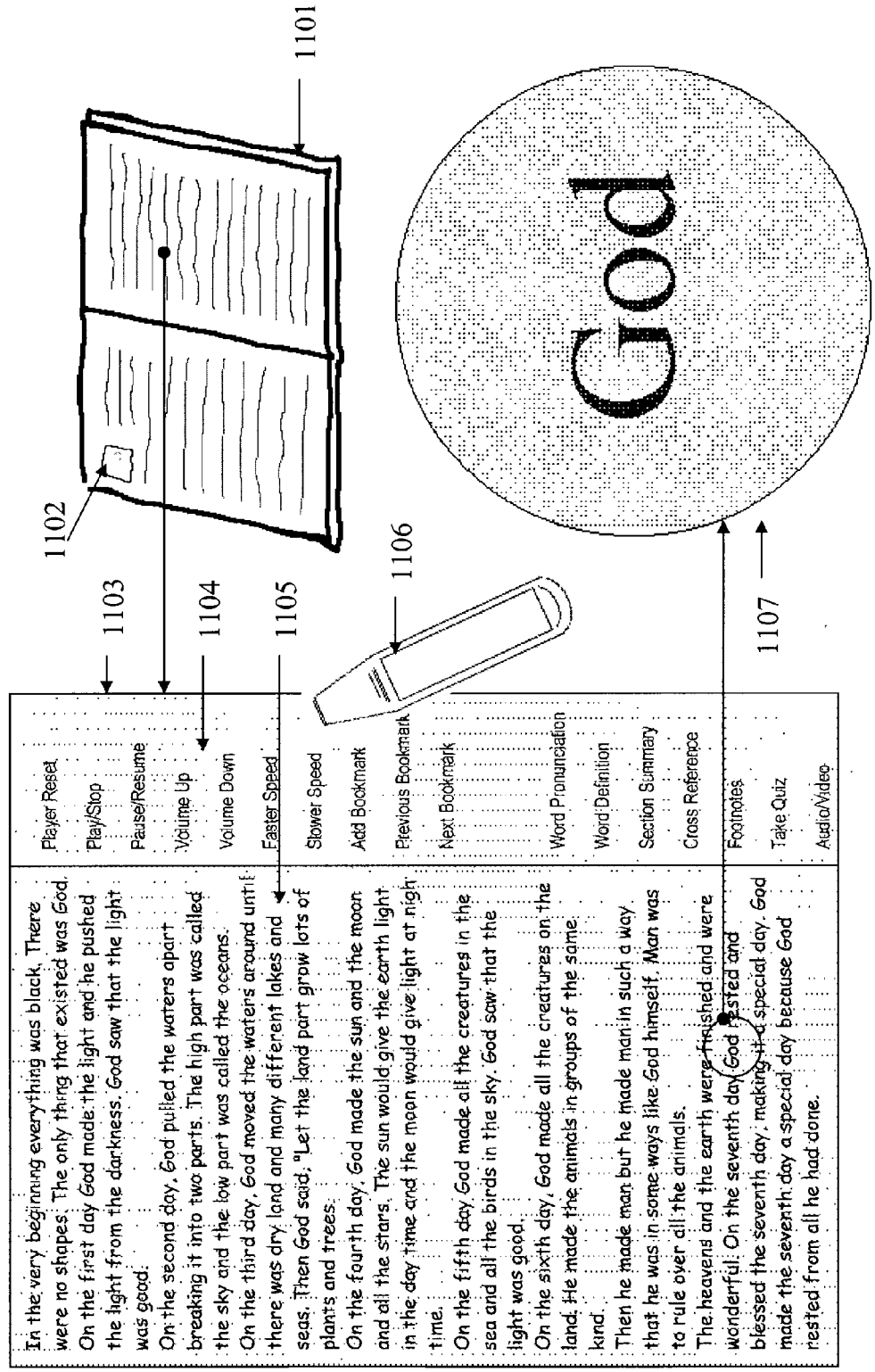
FIG. 11 shows an embodiment of an active print book application.

An active print (e.g., on paper) book of the present invention is a book with tiny dots (i.e. HyperCode) printed to constitute the text and graphics. In other words, in the book, text and graphics that convey recognizable information (such as pictures of objects, e.g., living organisms, sceneries, art, and letters, numbers and symbols) are made with tiny dots. These tiny dots are so small that they are unobtrusive (and preferably nearly invisible) to naked eyes, therefore do not interfere with human reading of books. For example, FIG. 11 depicts an "active book application" where 1101 shows an active book, which is a regular paper book with embedded electronic coordinates (x, y, z), represented by tiny dots printed on the pages. The dots are arranged to represent embedded logical 1s and 0s to encode the embedded coordinates, which are only recognizable by a properly programmed processor coupled to a sensor. Functionally, these tiny dots store electronic coordinates within printed text and graphics, when read and decoded by a handheld activator 1106, the recovered coordinates can be linked to various functions and data through an action table. For example, conditions can be set in the action table that a function such as PlayAudio( . . . ) will be executed when x<20, y<20, and z=999999999. Further, coordinate z can be a very large number such that various functions and data can be uniquely identified. Coordinates x and y can be as accurate as, for example, a fraction of 12 point sized character on paper. As a result, any single character, or any character sized graphical object on a page can be linked with distinctive electronic data.

An activator 1106 is a dual-purpose electronic device that, when used by a user to "touch" or "click" on an active book, it reads and decodes the embedded electronic codes, and performs the designated function such as playing out a word definition. Detailed functions of the activator will be further described in FIG. 12. FIG. 11 shows an embodiment having a printed download button 1102 in an active book. When the button is clicked on using the activator 1106, dynamic (both audio and video) contents for the entire book will be downloaded to the device. 1107 shows an enlarged version of the circled area in an active book page 1103, with intertwined text and dots that represent explicit contents and embedded messages. In FIG. 11, an example of a page 1103 from an active book 1101 has been coded with tiny dots, and has 2 columns of text or graphics. Left column 1105 shows regular contents of a print book with text, graphics (if any), and embedded codes (or data). Right column 1104 contains functions (showing text terms) that are usually application dependent.

Functions on the right column 1104 can include "control functions" such as volume up or down, faster or slower reading speed, and "task functions" such as word definition, word pronunciation, and cross-reference. Most control functions are usually pre-programmed independently to a default setting and the setting can be changed incrementally. For example, each time function "Volume Up" is touched, the volume setting will be upped and remembered in the processor, and the speaker volume will be turned up one step, until it reaches the highest. On the other hand, task functions are normally remembered in a function register each time a new task function is selected. Hence changing a "task function" will not interfere with the settings of "control functions". For example, a user may select and touch "Word Definition" on the task functions with an activator, subsequently he or she can tap on a word on the left column 1105 to hear the definition of the tapped word played back from the activator. As the process is repeated, the user may decide to speed up the audio playback by touching the "Faster Speed" function. This will change the speed setting in the activator while retaining the previously selected task function and the setting of other control functions, allowing the user to hear word definition in faster speed until another function is tapped on.

An application of the active print book is books for children. With a handheld reader/player device (herein refer to simply as "activator", although it can launch functions and display information to give feedback to the user), small children can listen to and learn the pronunciation of words or sentences. By simply touching the activator at intended graphics or text, the activator will read embedded data and their coordinates, and will play back the associated audio and/or video segment. Likewise, text and graphics in a storybook can be linked to videos and cartoons to bring interactive learning, dynamic sounds and images into children's book reading activities. For example, a figure in the storybook may be an image of an elephant, which connotes that further information may be retrieved about an elephant by interfacing with data from the device. To implement such interactions, buttons may be provided in the active print book for response to prompt played back to the user. Such interactive and dynamic presentation will be able to aid to retain the attentiveness of the activator much more than the static mode of presentation such as ordinary printed matters can. In such active print applications, beside a visual display, audio output units, such as speakers will be necessary. Such audio equipment can easily be included in an activator (or reader/player), e.g., a handheld device of the present invention. At the present, many PDAs and cell phones have both visual display and sound output capabilities. An activator that resembles PDAs and cell phones can take advantages of such capabilities.

Active Print Book (HyperCode) Reader/Player

Figure 12B:
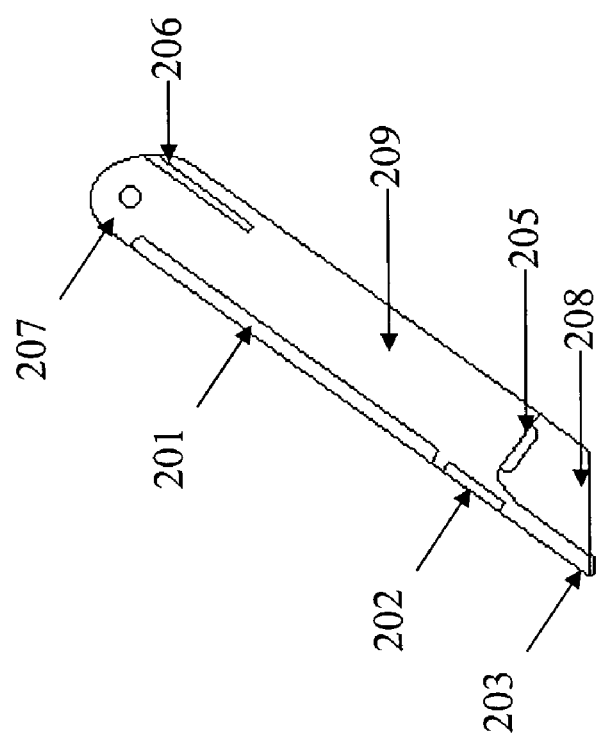
FIG. 12B shows the side view of an embodiment of the handheld device of FIG. 12A of the present invention.
Figure 12A:
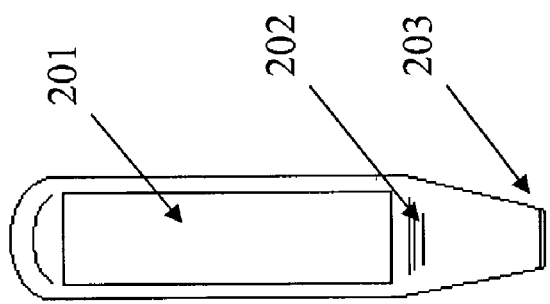
FIG. 12A shows the top view of an embodiment of a handheld device of the present invention.

A reader/player "activator" is an important piece of equipment of all HyperCode applications. One activator can be used universally in many different applications, only the memory contents need to be replaced for such varied applications. Activators may come in various forms, though a small handheld device is depicted in FIG. 12A and FIG. 12B, other devices such as a cell phone or an optical mouse can also be adapted to become a HyperCode ready activator.

Most activators are portable devices. They can have configuration or features similar to those shown in FIG. 12A and FIG. 12B. The embodiment of the portable device has an electronic I/O device containing a built in CCD/CMOS sensor 1205 with its own light source protected with a clear cover 1208, an audio speaker 1202, an LCD display 1201, a wired or wireless network/Internet connector 1207, an external memory slot 1206, an internal CPU and RAM, and a pressure sensitive switch or trigger 1203 located at about the tip of the activator. While the switch or trigger 1203 illustrated here is pressure sensitive, different methods such as point and click can also be implemented, depending on the need of each application. Further, certain function buttons (for example, volume up and down) can also be implemented in the activator for users' convenience.

To start any application, contents may first be loaded into an activator. There are two modes of operations, online and offline. For online mode, an activator receives contents from networked resources (Internet or other networks) through wired (e.g. a PC) or wireless (e.g. a cell phone) connection. In this case, contents are downloaded and played out in real time. For offline mode, contents can first be downloaded into the internal memory of an activator from networked resources. When done, the activator is then taken offline. For instance, while the activator is connected to the Internet or a network, one can simply tap the activator on the download button in an active print book. The downloading commands are embedded in the print button, and will instruct the activator to link to and download the desired data resource automatically. After contents are downloaded, the activator is disconnected from the network and becomes a mobile player. Alternatively, external storage memory devices such as memory sticks, cartridges, or cards can be used to provide contents. Contents on the memory sticks can be loaded to the activator memory 1209 by simply inserting the stick into the external memory slot 1206, and removing it when done. With the contents in the activator, a user can trigger the switch 1203 by touching the device on an active print page. The handheld activator is constructed with mechanical parts and electrical circuits that, as a result of tapping or clicking on an active print page, the CCD/CMOS sensor 1205 takes a snap shot of the intended area, the pixel patterns are then decoded and the instruction for the application recovered in the processor 1209, and the instructions are subsequently carried out to maybe play an audio segment from the audio speaker 1202, show a video clip on the LCD display 1201, or turn up or down the volume. Such a device can be adapted to be used for many of the applications depicted in present disclosure.

Much of the technology and devices that are described in details in FIGS. 11 & 12 are applicable to any kind of HyperCode applications. The descriptions of the figures below will focus more on their process and application. It is noted that FIGS. 11 and 13 through 19 are schematic representations in that due to the limited space of the present disclosure, the dots (pixels) in the figures are only schematic representations for illustration purposes and do not in fact contain embedded messages.

Active Print Dictionary Application

A variation to children's active print books is an active print dictionary application that includes a dictionary with pixels or tiny dots printed on its pages and a reader/player "activator". One example is the handy pocket size dictionary that many travelers (business or leisure) carry when they travel in foreign countries. The audio capability of an active print dictionary makes this application especially useful for instant multi-language translation. With an active print dictionary and an activator, a user can select a language, point and click on the phrase(s) that he or she wishes to ask, and the activator will play out the phrase(s) in the foreign language.

Figure 13:
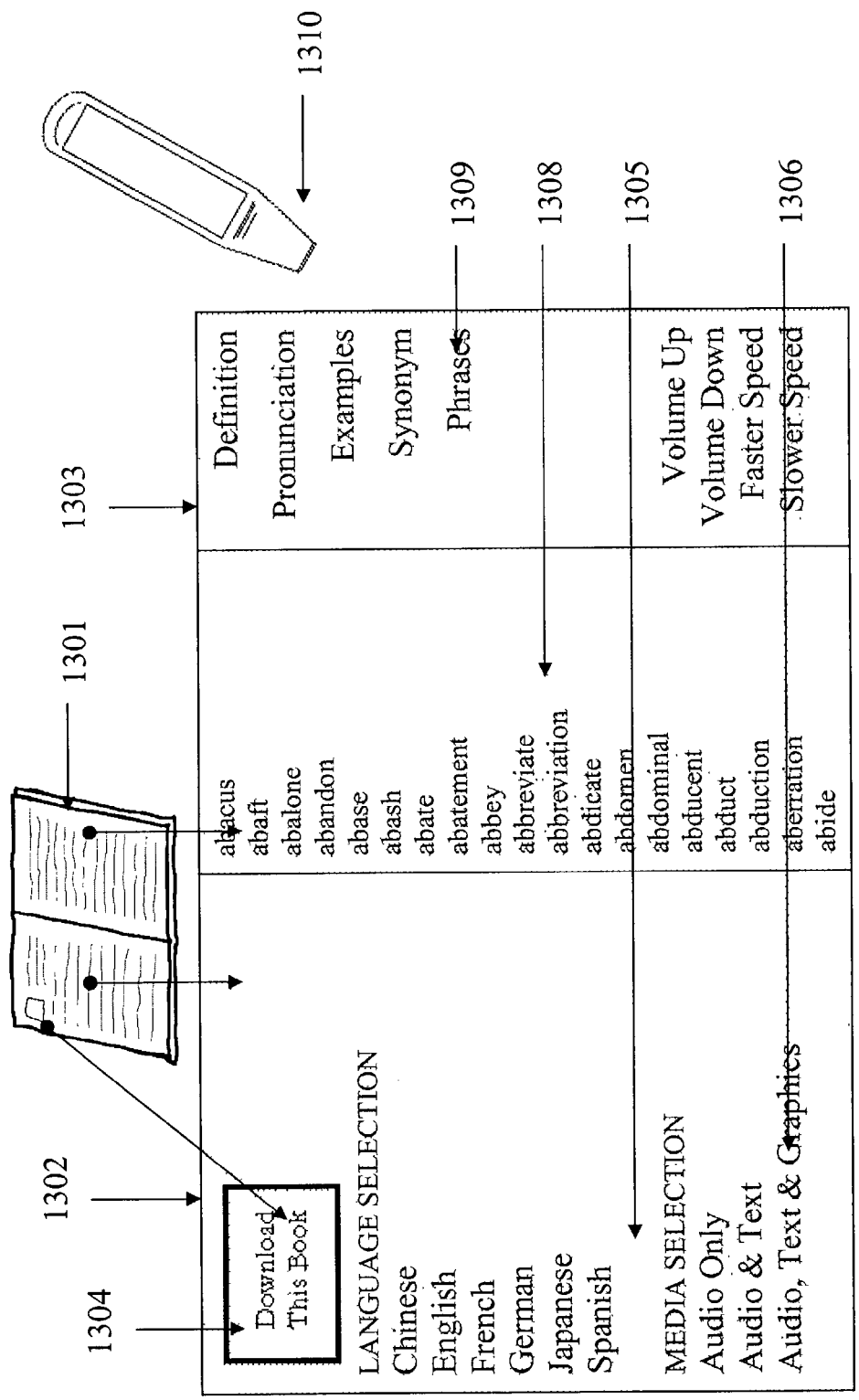
FIG. 13 shows an embodiment of an active print dictionary application.
Figure 14:
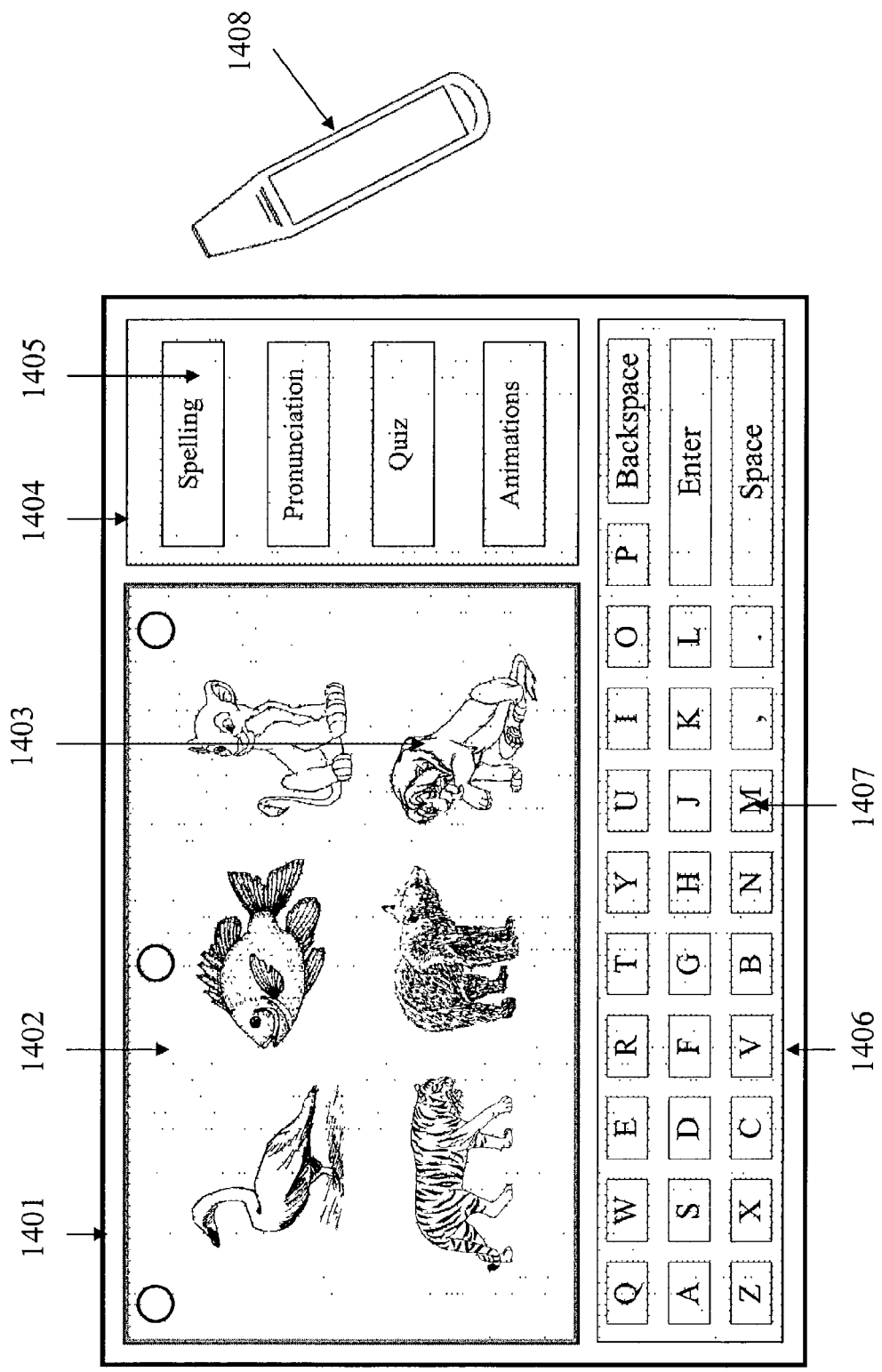
FIG. 14 shows an embodiment of children's active game book application.

Very similar to an active print book application except for the contents, an active dictionary application is depicted in FIG. 13. On the front page 1302 of an active print dictionary 1301 is a download button 1304. The front page can contain a list of different languages 1305 such as English, Spanish, Chinese, Japanese, . . . and so on. In addition, it can also have a media selection 1306 that lets users choose what to show (such as audio only, text only, or audio and text) on the activator 1310. In an active print dictionary, columns of vocabularies 1308, phrases, and a "function panel" column 1303 (the far right column in this example) can be found on a printed page. Such functions may include definition, pronunciation, synonym, phrases, and volume up and down 1309. For application on different languages, the handheld activator 1310 can be constructed such that removable memory sticks, cartridges, etc. can be incorporated. Each memory unit can contain more than one language. A memory unit can be inserted into the activator to load contents, instead of downloading the dictionary electronically. In this way, a user can switch from one language (such as German) to another (such as French) by simply tapping on the language selection 1305. Once a language is selected, the user then selects a function such as definition, pronunciation, play aloud etc. When the functions are all set, the user can look up the words or phrases in the active print dictionary, and touching them on the page to get the information needed.

Children's Active Game Book Application

Another variation of children's active books is an active game book application. Depicted in FIG. 14, it includes a game board 1401 with a printed keyboard 1406, a command panel 1404, a variety of interactive pages 1402 children can flip through, and a handheld activator 1408. Similar to other applications, the contents may be downloaded using a download button, or using external memory devices. The keyboard, the pages (or cards), and the command panel are all encoded with subtle, tiny dots that signal different messages to the activator, so that the activator will be able to translate every action requested.

The interactive pages 1402 may be designed to target different age groups, and further categorize into subjects such English, math, and so on. Command buttons 1404 may include functions such as spelling 1405, pronunciation, quiz, animations, and the like. The application is intended to encourage children's learning activities through interactive games involving bright pictures and audio/video segments. For young audience, an alternative design of the application may include a screen display for better viewing of picture, cartoons, etc., and a pen-like activator for easier control of the activator, (not shown in FIG. 14).

To briefly describe the process of the game, a child may simply use the activator 1408 to tap on a command button "Spelling" 1405, then tap on the picture of the lion 1403, causing the activator 1408 to read aloud the spelling L-I-O-N, which will also be displayed on the LCD device of the activator. Another example involves a child taking a quiz on tiger by tapping on the command button "Quiz" and the picture of the tiger. The child may be asked to spell "tiger", He will then use the activator 1408 to touch on the keys 1407 from the keyboard 1406 to spell TIGER. When finished, the child hits the "Enter" key, prompting the CPU in the activator 1408 to determine whether the spelling is correct, and give a response accordingly. The feedback or response provided by the activator can be in the form of voice, music, other sounds, visual display (e.g., on a liquid crystal display as in a PDA or cell phone, or separately in a TV or computer monitor), or a combination thereof.

Active Print Universal Interface Gadget Card Application

Another application of the present invention is a universal interface gadget that may come in forms like a credit card sized gadget card or a mouse pad, and serves as a universal function card. The pixel patterns of functions can be printed on any smooth surface such as paper, plastic, metallic surface, etc., and the controls 1504 may include generic function buttons such as play, stop, fast forward/backward, faster/slower speed, volume up/down, and so on.

Figure 15:
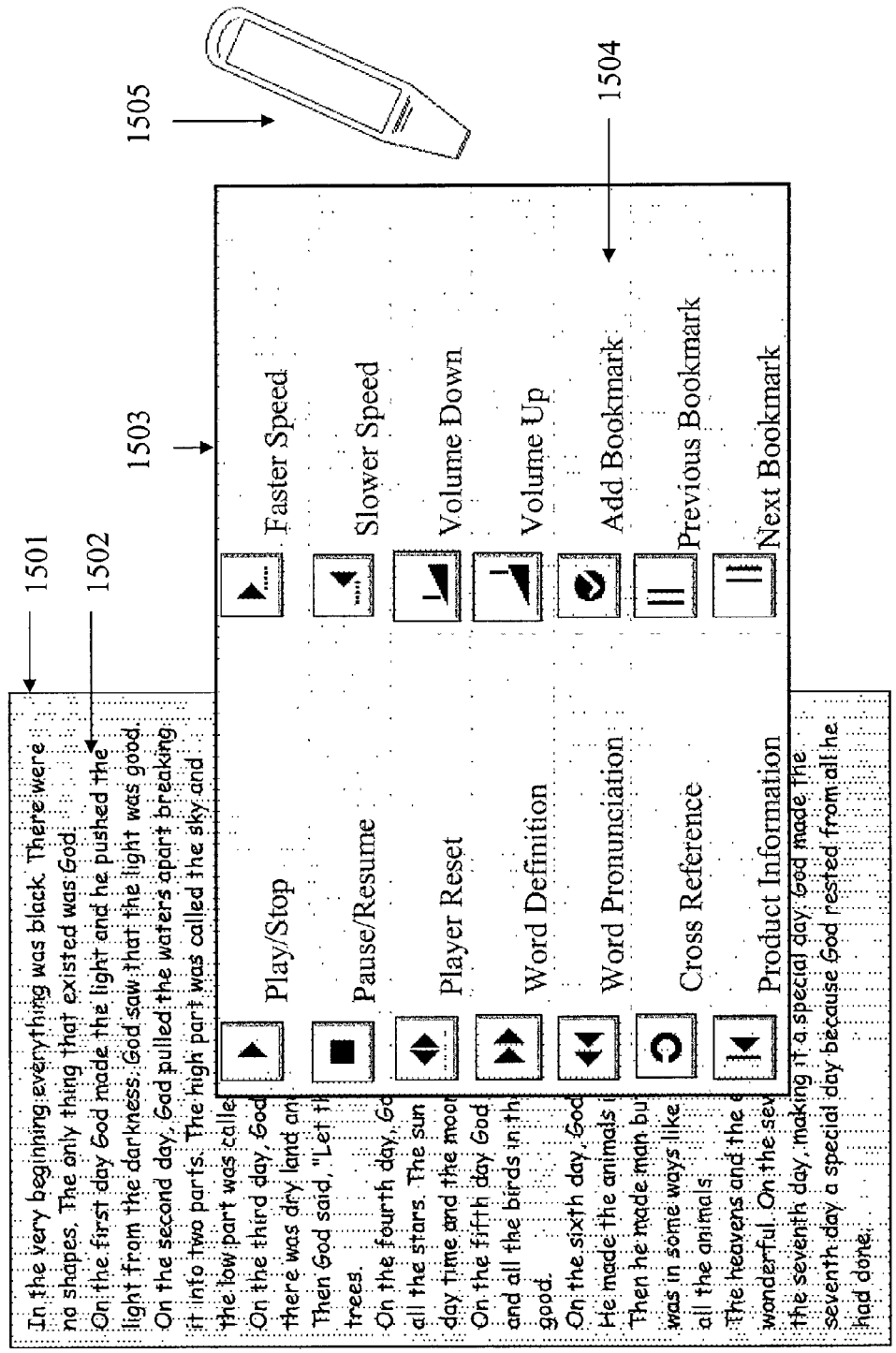
FIG. 15 shows an embodiment of an active print universal interface card application.

In FIG. 15, the application is complete with an active book 1501, an activator 1505, and a function gadget card 1503. The activator can be wireless (such as a cell phone) or tethered (for example, an optical mouse). The expanded audio/video content of an active book can be a memory stick that plugs into a wireless activator, or it can be downloaded into the activator using the download button on an active book in the similar fashion as in previously described applications. In the case of all time Internet connected devices (e.g., a wireless phone, or a tethered optical mouse), content is downloaded in real time, and audio/video segments are subsequently played out.

A universal credit card sized function card 1503 can be carried in a user's wallet. Coupled with a wireless activator 1505 which may look like a cell phone, a user can conveniently tap on an active book 1501 (or an active print magazine) to request an audio/video segment to be played back in a speed or volume that is fitting to the user. Alternatively, if the function card is in the form of a mouse pad, a user sitting in front of a computer or a TV can easily play the expanded audio/video contents of the active book using an optical mouse (not shown). To change the volume or the speed, the user can touch the activator 1505 on the desired control function, (such as Volume Up 1504), causing the tiny dots of pixels to be decoded and send instructions to the activator to change the state of its volume (or similarly in another case, change the speed) accordingly. Besides active print books, the universal gadget card will be very useful when combined with various active print materials, and a device that is connected to the Internet all the time. Such active prints may include, but not limited to magazines, product catalogs, scientific reports, research papers, and student workbooks. This will allow readers to readily obtain expanded product information as they browse active print magazines, or cross reference relevant data/information in various reports, . . . etc. While electronic messages (or coordinates) are encoded and stored in the regular contents (text and/or graphics) of these active print materials, the "function panel" column, similar to the one in 1103 of FIG. 11, can be omitted from the pages of the active print material. This is possible because the universal gadget card will be used as a short form of the "function panel", hence saving valuable print space in the active print pages.

Active Print TV Guide Application

Figure 16:
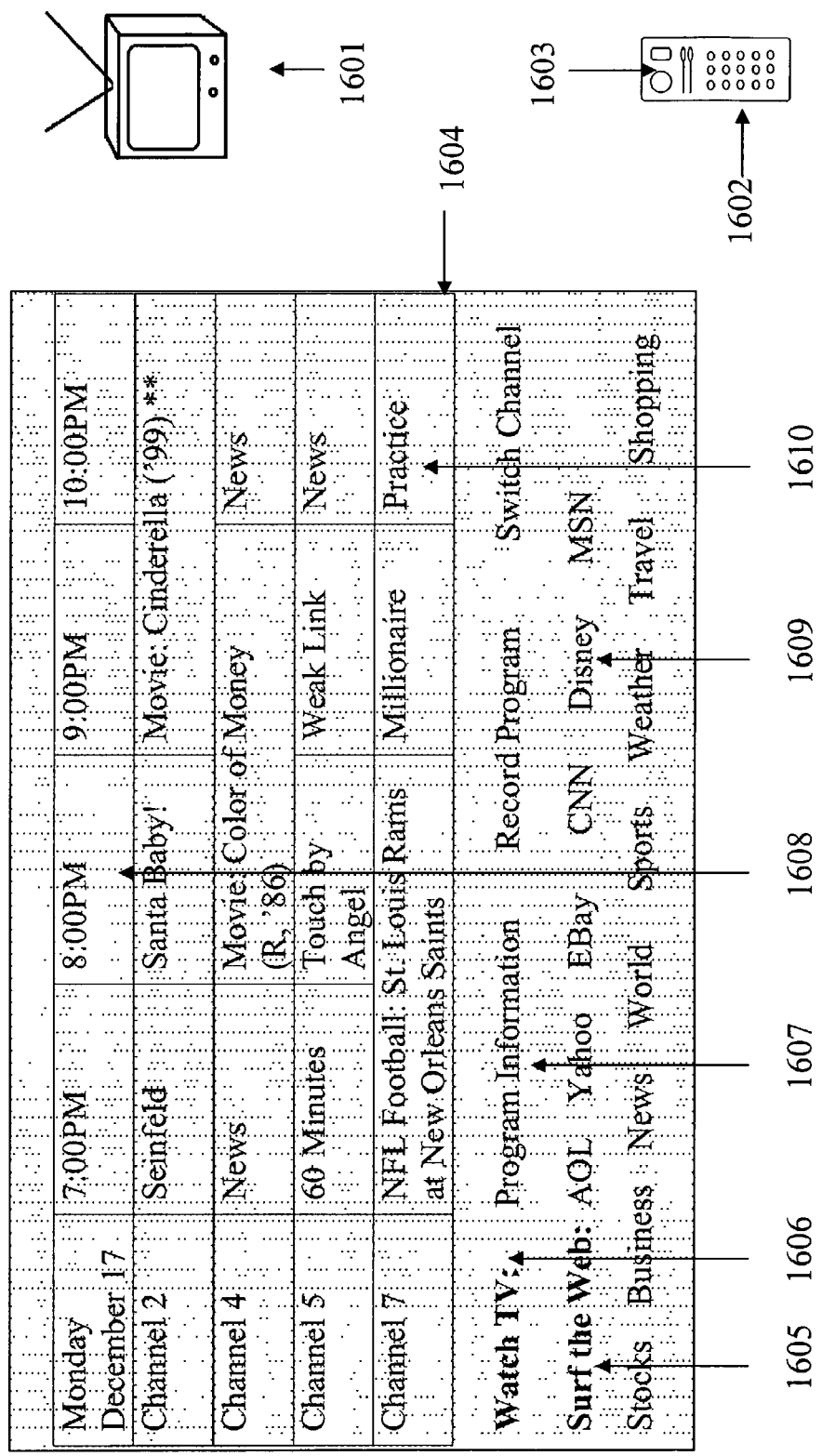
FIG. 16 shows an embodiment of an active print TV guides application.

Another application of the present invention is an active print TV guide system which can include a TV guide 1604 printed with tiny dots (HyperCodes), a TV 1601, and a TV remote controller 1602 coupled with a built in CCD/CMOS sensor 1603. The TV can be used as a regular TV, or as a Web TV allowing viewers to surf the Internet. FIG. 16 shows an example of such an active TV guide system. An example for a page 1604 of an active TV guide has the traditional entries like dates, channels, show times 1608, programs 1610, and the like. It may also include TV function selections 1607 (such as program information, record program, and switch channel), as well as major Web-site selections 1609 (for examples, AOL, Yahoo, EBay, CNN, Disney, . . . etc.), with categories such as stocks, business, news, sports, . . . and so on, below the Web selections. An active TV guide works in similar fashion like other applications of the present invention. By touching the remote controller anywhere on an active print TV guide, the pixels are decoded by the processor in the remote controller, the command is subsequently performed, causing the TV to switch to a desired program, to record a selected program, to jump to a Web-site, and the like.

A viewer can first select the TV mode (e.g., Watch TV 1606) or the Web mode (Surf the Net 1605) by tapping on either choice on an active guide 1604 using the remote controller 1602. The remote controller 1602 remembers the mode, until the selection is changed. TV or Web modes 1606 and 1605 are switches that can be toggled back and forth. When the mode is set to TV, and a viewer simply wants to watch a certain TV program, he or she can tap the remote controller 1602 on the desired program (for example, a movie), and jump directly to it without having to surf through the channels. If the viewer wishes to read about a program or record a program, he or she will first tap on the appropriate function, then tap on the program to send the complete instruction to the remote controller, which will execute the request. When the viewer wishes to browse the Internet (surf the Web), he or she uses the remote controller 1602 to tap on the Web mode 1605, the TV/Web mode is switched to the mode on Surfing the Web, allowing the user to begin accessing Web-sites in the Internet. For example, the viewer can then tap on Yahoo, followed by a tap on news to get to the Yahoo news Web page.

Active Print Keyboard Application

Figure 17A:
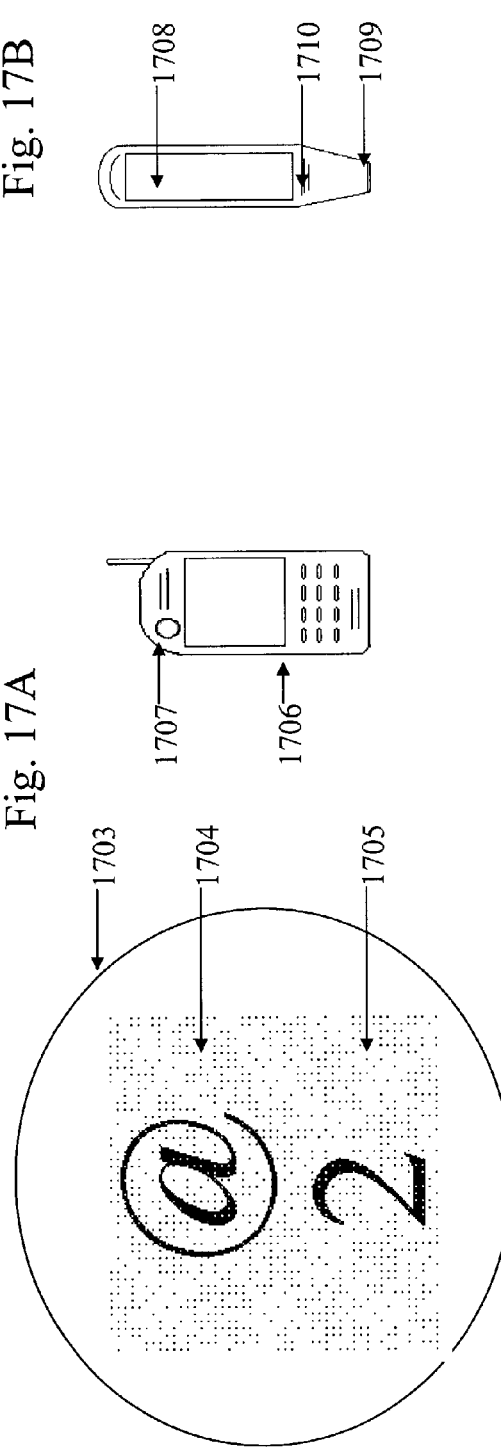
FIG. 17A shows an embodiment of an active print keyboard application.
Figure 17B:
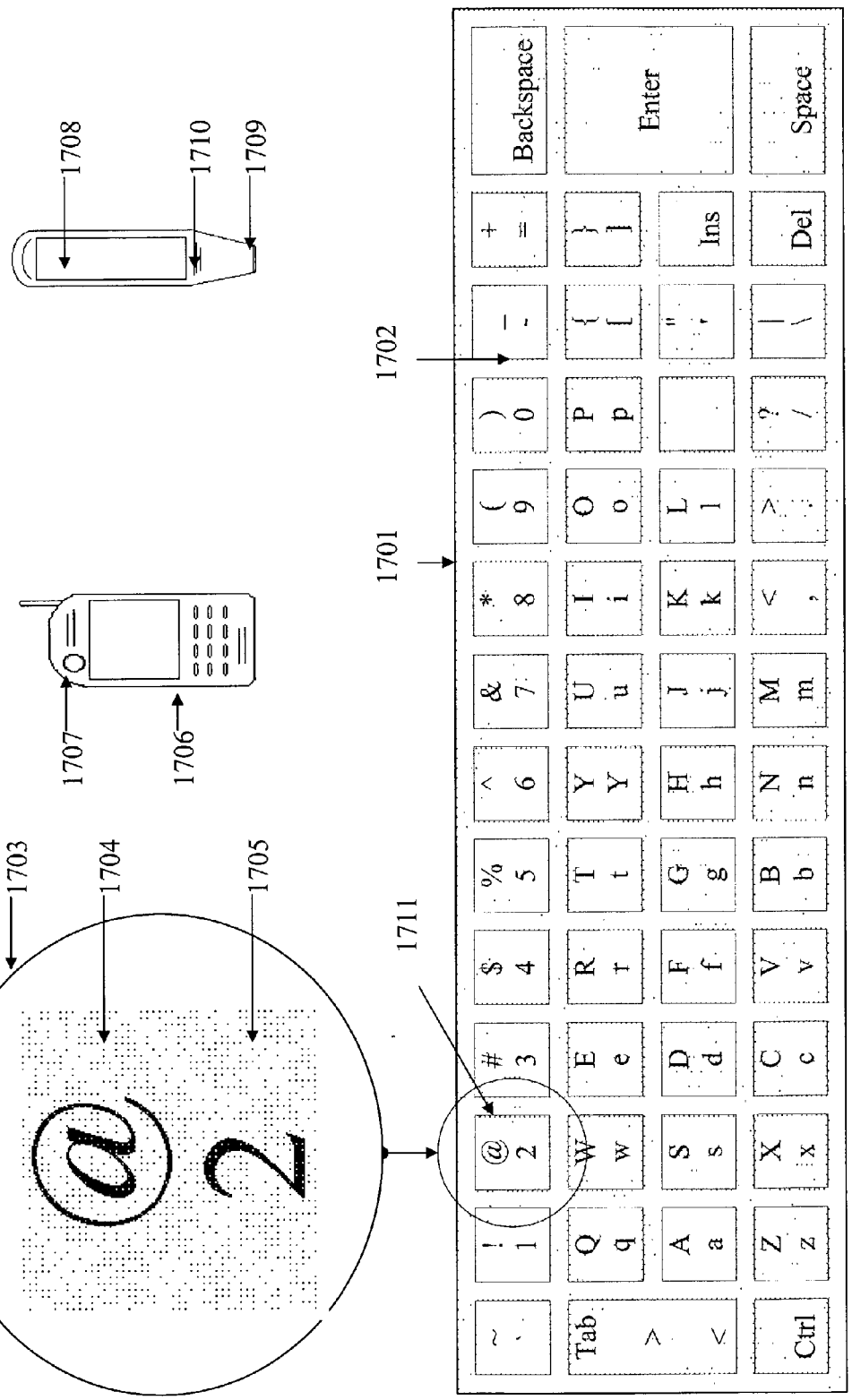
FIG. 17B shows an alternative embodiment of an activator for a print keyboard application.
Figure 18C:
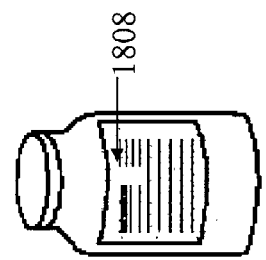
FIGS. 18A to 18D show embodiments of active packaging label application.
Figure 18D:
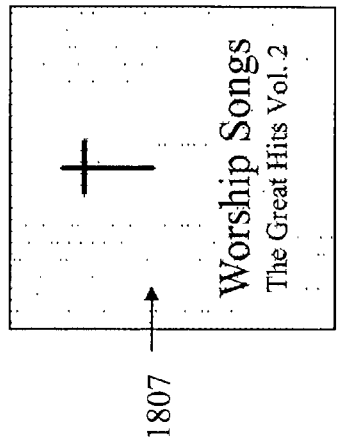
Figure 18B:
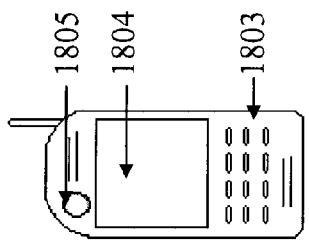
Figure 18A:
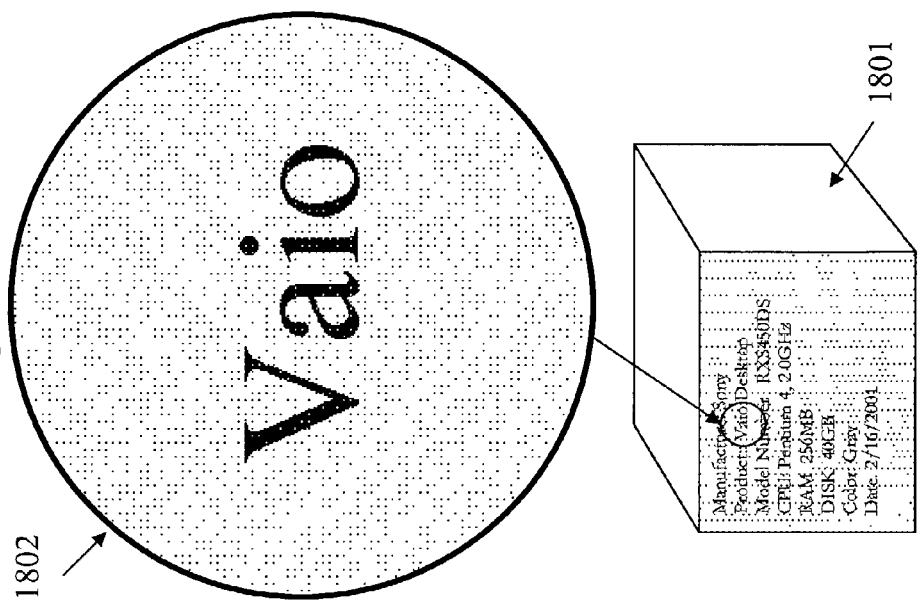

Although lap-top computers are common, they are still cumbersome to carry and use. Smaller devices such as personal digital assistants (PDAs) may be carried with more ease. Data entry into such devices is difficult. In fact, entering text into small PDAs, palm-top computers, cell phones, and the like, can be a challenging task since these devices usually do not come with a built-in keyboard. An active print keyboard according to the present invention provides a convenient solution. An active print keyboard is a printed medium having graphical interface for entering text into small handheld devices. It is "active" in the sense that the active print keyboard has an embedded message that a reader device can be used to decode the embedded message to enter text into an electronic device by reading from the printed pattern of the active print keyboard. FIG. 17A shows an embodiment of such an active print keyboard device. The activator shown in FIG. 17A looks like a cell phone and has cell phone function. FIG. 17B shows another embodiment of an activator. The hand-held activator 1707 (or activator 1708) having a display 1710 (or display 1706) can be used to input characters from an active print keyboard 1701. Character objects, herein referred to as text, including letters, numbers, and symbols such as A, B, C, 2, 4, 5, !, @, *, & and the like, are encoded using HyperCode, and embedded into the active print keyboard 1701. For example, view 1703 shows a blown up version of key 1711, which represents number "2" in the lower case 1705, and symbol "@" in the upper case 1704, coded with HyperCode dots. These dots are the cells of pixels. This is a real life example in which the pixel pattern contains data. A user can use the active print keyboard 1701 to enter text by simply tapping a handheld activator 1708 on the intended keys on the active print keyboard 1701. A CCD/CMOS sensor 1709 located at the tip of the handheld activator 1708 will cause an internal mechanism (not shown) to activate the sensor 1709 to take a snapshot of the printed symbol (or key), the character (e.g., alphabets, symbols, or numbers) embedded within the key will be recovered by the handheld activator 1708 and then entered into the handheld activator 1708 as text. Also, the handheld activator 1708 can be constructed such that removable memory chips, cartridges, cards, etc. can be incorporated for application on different languages. In this way, when a particular language is to be entered using the active print keyboard, a memory unit (e.g., chip, cartridge, card) can be first installed in the handheld activator and an active print keyboard of the selected language can be tapped with the handheld activator to input the desired characters. The characters, as they are being entered, can be displayed in the display 1710 in the handheld activator 1708 of FIG. 17B. Various alpha-numeric displays such as those having liquid-crystal display, light emitting diodes, and the like can be used. Further, for better viewing, electrical connection can be made between the handheld activator 1708 and another display, such as a monitor or a display in a cell phone, PDA, palm-top computer, pen tablet computer, and the like. Alternatively, the active print keyboard 1701 can be used with cell phones, provided the right electronics and programs are installed in the cell phones. Although most people now use number pads on cell phones to enter information, it is cumbersome for text input since 3 alphabetic letters and 1 number are usually located on one key. By incorporating a CCD/CMOS sensor 1707 into a cell phone 1706, the cell phone becomes an activator, allowing users to enter text easily just as they do with the handheld activator 1708.

FIG. 17A shows a schematic illustration of an embodiment of an active print keyboard. The active print keyboard 1701 has keys 1702, each of which representing different functions that would, when properly activated and transmitted to a computer with the proper programming, mimic the function of a real computer keyboard, typewriter keyboard, or keyboard of a specialized machine (such as calculator, court reporter, etc.) to produce the proper data. Each of the keys 1702 includes printed dots (pixels) that are grouped together to show characters recognizable to a human by visual inspection. Such dots, which make up the characters and background behind the characters, however, are printed to represent logical 1s and 0s to encode embedded messages. The keys 1702 have hotspots according to the message-embedding scheme of the present invention such that when the CCD/CMOS sensor 1709 of a properly programmed activator (such as handheld activator 1708) captures a snapshot, the activator will be activated to input the appropriate function to the activator, such as causing the character of the key being clicked on to be displayed in the display of the activator. It is noted that such activations are not by means of mechanical forces or movement, or electrical signals coming directly from the keys but rather by decoding the embedded message coded by the pixel arrangements in the keys.

Active Packaging Label Application

Packaging plays a very important role in product marketing, especially for consumer products. Although shoppers often wish to learn a great deal about the products they plan to purchase, such detailed information is normally not readily available on product packages. For examples, before buying a compact disk (CD), shoppers may wish to listen to segments of the songs on an audio CD, or they may want to know more features about a software title or computer game. In other cases, they may want to have detailed directions or information about a medicine, or they may want to learn the detailed specifications of a product (such as a PC 1801) they are interested in. An enlarged version of the product package of the present invention that details the Sony PC "Vaio" printed with HyperCode dots is shown in blow-up view 1802 in FIG. 18A, which shows a real life pixel pattern. Today, most product packages provide only limited information, largely because such information usually takes up much space and can interfere with the packaging layout, or simply because there is not sufficient space on a package for smaller articles.

FIGS. 18A to 18D shows an active packaging label application of the present invention, it allows HyperCodes in pixels patterns to be printed on product packages, unobtrusive in a way similar to aforementioned applications, the tiny dots in the embodiments in FIGS. 18A–18D represent the patterns of pixels that provide shoppers with instant access to expanded product information resides either on the Internet or other servers. Information can be easily obtained using a cell phone 1803 (FIG. 18B) that is capable to decode HyperCodes and is connected to the Internet. A user may tap on a product package printed with HyperCode pixels, (for example, the instruction label on a medicine bottle 1808 in FIG. 18D), using the CCD/CMOS sensor 1805 on the cell phone 1803. The sensor 1805 takes a snap shot of the touched area, the dots are decoded to display certain information about the product. In some cases, the decoded message can refer to a Web-site, e.g., "www.@.com", and the cell phone is connected to the Internet address, retrieves information, (in this example, detailed instructions on how to take the medicine), and displays it on the LCD display 804 on the cell phone. Besides the cell phones, the application also works well with another "activator" (handheld or tethered) similar to those described in other applications, (not shown in FIGS. 18A–18D). Information booths or demo stations that are equipped with an activator and a monitor can be set up easily in a variety of stores, allowing customers to bring merchandise to the station, and play back detailed product information, including audio and/or video clips. Information can also be loaded in the device, even without the Internet. Similarly, the activator cell phone 1805 can be used on the package shown in FIG. 18A or the CD cover 1807 shown in FIG. 18C.

A natural extension to this application is information booths at convention centers, tourist information centers, government offices, or any place where information is frequently requested. In such places, information booths will be set up with an active print information guide or manual, an activator, audio output, and a screen display. Visitors will be able to quickly flip through the active print guide to find their desired topics, use the activator to touch on the intended areas on a page, and view the information from the display. An active print information guide is more user friendly than touch screen kiosks because it looks much like a regular print guide or directory, and users will not have to go through layers of menus to find information of interest to them. People have generally found it to be much more convenient to have a document in paper form, in which they can put physical book marks, write in notes at the margin, and the like. It is especially useful where abundant or versatile information is regularly needed or requested.

Active Print Map Application

Another embodiment of the GUI of the present invention is an active print map system, which can include an active print map (e.g., paper map) and an activator. A need exists for this invention because the Internet has become a convenient tool for people to find maps and direction to specific addresses and a convenient device will make its use even more ubiquitous. Other than merely looking up streets in maps, with certain maps and the proper devices, additional information such as restaurants and hotels near certain locations in the map can also be identified. This information can be presented in the form of an interactive map on a computer screen, with menus, buttons, and hotspots on maps. For example, a person may select a location hotspot on a map with a pointer, then click a button to find restaurants or hotels near the location. However, such an interactive map system would still require a big computer screen, and is usually beyond the reach of users using mobile devices.

According to the present invention, an active print (e.g., on paper) map replicates generally the functionalities of an interactive electronic map (which is presented on a computer monitor) with hotspots and buttons printed on a surface (e.g., paper). Information relates to hotspots such as at location x by y are encoded and embedded within the printed maps. Information relates to buttons such as their functions are encoded and embedded as well in the active print map. Retrieval of information from the map is accomplished by a handheld activator. Such a handheld reader/player can have a built-in CCD/CMOS sensor for input, and a small screen for output.

FIG. 19 shows an illustrative schematic embodiment of an active print map of the present invention. On the face, an observer while viewing the map with his eyes, sees visually the map layout with streets. The active print map 1901 is formed by tiny dots (to represent pixels arranged into cells) that are organized in such a way to convey a recognizable pattern of features commonly found in maps, such as streets, letters, numbers, words, symbols, background, etc. The dots, which make up the streets, letters, numbers, etc. are arranged to represent embedded logical 1s and 0s to encode the embedded coordinates, which are only recognizable by a properly programmed processor coupled to a sensor that inputs the pattern of the dots to the processor. In the active print map system, the built-in CCD/CMOS sensor 1906 in the activator such as a cell phone like device 1904, takes a snapshot of the hotspot when the activator is clicked on (e.g. by touching) a hotspot on the map. Subsequently, the location data x and y (related to that location) embedded in the map will be recovered and displayed on the small output screen 1905. The active print map system can be programmed to suit a variety of needs and functions. For example, to associate the data with an action, a user subsequently can click a button on the map, and then the activator will take the previously read data with the current read action to form a complete search query, such as "find hotels near location x and y". And then the query will be sent to an information server (either a built in processor, or a remote one), and the results of query will be received and displayed on the output display screen. Memory units (e.g., cartridges, chips, cards) can be used to provide removable information storage, such as for different geographic locations. For example, when a person wants to locate hotels in a particular area (e.g., 12$^{th}$ St. by Market St.) in a city (e.g., San Francisco), that person can simply open an active print map of that location with the appropriate embedded information on restaurants and use the handheld activator to interrogate the map at the desired area (for example, by clicking the hotspot on the map at "Hotels" site 1903 and the location site 1902). Alternatively, the device can be programmed so that the process is to tap on the desired area first and then tap on the desired query (e.g., for hotels). Upon interrogation, if the existing memory unit already installed in the activator does not contain the information requested, the display can prompt the user to insert the right memory unit. If the right information, e.g., on restaurant, is found, the display will display the information, which can include the address and direction to the site. Further, in an embodiment, if the requested information is not found in the memory unit already installed in the activator, the activator can automatically launch a connection to the Internet by a browser, such as the Internet Explorer or Netscape, to call up the requested information from a pre-selected Web-site, or to perform a search function. Techniques to program computers and microprocessors to provide information upon interrogation or launching connections in the Internet are known in the art. One skilled in the art with the knowledge of the present disclosure will be able to implement such programs. It is to be understood that the present disclosure describes with specificity preferred embodiments and modifications can be made by one skilled in the art to arrive at alternative and/or additional embodiments within the scope of the present invention.

What is claimed is:

1. A device for translating prints into human sensory inputs, comprising:
    (a) reader for sensing light from a selected pattern of pixels on a printed surface and determining pixel values of pixels in said pattern of pixel, said pattern of pixels constituting a foreground visual image that conveys cognizable information to an observer; and
    (b) processor having a program of code means readable by the processor to recover embedded message from the pattern of pixels, the program comprising:
        (i) code means for determining the embedded message by determining binary values based on the pixel values for pixels from the pattern of pixels; and
        (ii) code means for performing a function according to the embedded message to result in resultant information displayable by a display suitable for human sensory reception.

2. A device according to claim 1 further comprising a display.

3. A device according to claim 1 further comprising a memory containing data and said code means for performing data retrieves data from said memory not via hyperlinking to a Web-site for display.

4. A device according to claim 1 wherein the code means for determining the embedded message divides the pattern of pixels into cells, a plurality of which containing a matrix of pixels to determine said binary values.

5. A device according to claim 1 wherein the code means for determining the embedded message divides the pattern of pixels into tiles, at least some of the tiles each include cells each containing a matrix of pixels, wherein some of the cells represent the location of the corresponding tile in the pattern and some of the cells direct the function being performed.

6. A device according to claim 1 wherein the code means for determining the embedded message determines binary values using contrast of brightness to compare pixel values of selected pixels to the pixel values of pixels neighboring thereto in the pattern of pixels.

7. A device according to claim 6 wherein the reader comprises a light source for illuminating the pattern of pixels to provide light pattern of different pixel values and the reader comprises an image sensor to sense the light from a plurality of tiles simultaneously.

8. A device according to claim 1 wherein the processor directs a display to emit a signal to prompt the observer to further use the device to decode a different portion of the pattern of pixels or a different pattern of pixels, thereby providing interactive operation.

9. A device according to claim 1 wherein the code means for determining finds a central region in a view field when the view field is imaged by the reader to perform the function.

10. A device according to claim 1 wherein the code means for determining can determine from a selected pattern of pixels showing a visual image of a keyboard wherein the embedded data represent a keyboard character such that the code means for performing results in display of a character corresponding to the keyboard character sensed by the reader.

11. A device according to claim 1 wherein the code means for determining is coded to determine from a selected pattern of pixels showing a visual image of graphic or text wherein the embedded data represent pointer to one of audio information, visual information, and a combination thereof connoted by the graphic or text such that the code means for performing displays the connoted information when the reader senses the pattern of pixels showing the visual image.

12. A device according to claim 1 wherein the code means for determining is coded to determine from a selected pattern of pixels showing a visual image of a map wherein the embedded data represent secondary map information such that the code means for performing displays the secondary map information when the reader senses and decodes the pattern of pixels showing the visual image of the map.

13. A device according to claim 1 wherein the processor further contains code means to retrieve data from an Internet Web-site when the processor determines it is unable to locally obtain information requested in the pattern of pixels, wherein the processor does not directly launch a connection to said Web-site when the pattern of pixels is sensed by the reader.

14. A device according to claim 1 wherein the reader captures an image of a field of view of a hot spot having a plurality of tiles each including cells that each contains a matrix of pixels, the tiles each having first coordinate information, second coordinate information and function information, wherein the program finds the dimension and location of the tiles in the hot spot.

15. A device according to claim 14 wherein the program finds the dimension and location of the plurality of tiles in the hot spot and determines the center of the field of view and the first coordinate information and second coordinate information of said center.

16. A device according to claim 14 wherein the program finds the dimension and location of the plurality of the tiles in the hot spot and determines the center of the field of view and the first coordinate information, second coordinate information of said center by computing the averaged first coordinate information, second coordinate information and the function information of the tiles and comparing to the first coordinate information, second coordinate information and function information of a tile in the field of view.

17. A device according to claim 14 wherein the program finds the dimension and location of the tiles in the hot spot and determines the center of the field of view and its first coordinate information and second coordinate information by computing the averaged first coordinate information, averaged second coordinate information and averaged function information of the plurality of tiles and comparing to the first coordinate information, second coordinate information and function information of a tile in the field of view to determine whether the tile has error and repairing the tile if error is detected.

18. A device according to claim 14 wherein the program activates code means to perform according to the function information of the center of field of view if the center is within a predetermined range in the first coordinate and a predetermined range in the second coordinate.

19. A method for translating printed pattern into human sensory reception, comprising:
(a) sensing light from a print showing a pattern of pixels and determining pixel values of pixels in said pattern of pixels, said pattern of pixels constituting a foreground visual image that conveys cognizable information to an observer and containing an embedded message;
(b) recovering an embedded message from the pattern of pixels by determining binary values in the pattern of pixels; and
(c) performing a function according to the embedded message to result in resultant information displayable by a display suitable for human sensory reception.

20. A method according to claim 19 further comprising using contrast of brightness to compare pixel values of selected pixels to the pixel values of pixels neighboring thereto to determine the binary values.

21. A method according to claim 19 further comprising arranging the pixels in said pattern of pixels into cells each having a matrix of pixels, at least some of the cells each having one or more glyph pixels and neighboring background pixels; and for each glyph pixel determining the binary value of the glyph pixel based on contrasting the glyph pixel's brightness to a value derived from the brightness of the background pixels in the cell, and wherein the visual image shows text or an object.

22. A method according to claim 19 wherein the determining of the embedded data comprises dividing the pattern of pixels into tiles, at least some of the tiles each include cells, wherein some of the cells represent the location of the corresponding tile in the pattern and some of the cells direct the function being performed.

23. A method according to claim 19 wherein the determining comprises finding a central region in a view field when the pattern of pixels is sensed by the reader to perform the function.

24. A method according to claim 19 wherein the determining comprises determining data from a selected pattern of pixels showing a visual image of a keyboard wherein the embedded message directs to a keyboard character such that the code means for performing displays the character on the keyboard sensed by the reader.

25. A method according to claim 19 wherein the determining comprises determining data from a selected pattern of pixels showing a visual image of text or graphic wherein the embedded message represents pointer to one of audio information, visual information, and a combination thereof connoted by the text or graphic such that the code means for performing displays the connoted information when the reader senses the pattern of pixels showing the visual image; and wherein the embedded message does not contain a direct hyperlink to a Web-site.

26. A method according to claim 19 wherein the determining comprises determining data from a selected pattern of pixels showing a visual image of a map wherein the embedded message directs to secondary map information such that the code means for performing displays the secondary map information when the reader senses the pattern of pixels showing the visual image.

27. A portable device for translating printed pattern of pixel into human sensory inputs, comprising:
(a) portable reader for sensing light from a selected pattern of pixels and determining pixel values of at least some of the pixels in said pattern of pixels, said pattern of pixels constituting a foreground visual image that conveys cognizable information that is one of graphic, text, and a combination thereof to an observer; and
(b) processor associated with the reader having a program of code means readable by the processor to recover embedded data from the pattern of pixels, the program comprising:
(i) code means for determining the embedded data by determining binary values based on the pixel values for pixels from the pattern of pixels; and
(ii) code means for performing a function according to the embedded data to result in resultant information displayable by a display suitable for human sensory reception; and
(c) portable display.

28. A device according to claim 27 comprising a removable memory cartridge containing data retrievable by the processor for display for human sensory input.

29. A device according to claim 27 wherein the device is adapted for interactive operation.

30. A device according to claim 27 wherein the processor performs a function according to the embedded data initially attempts to retrieve data from a location that is not a hyperlinked Web-site embedded in the pattern of pixels when the device is applied to the pattern of pixels.

31. A method for translating printed patterns of pixels into human sensory inputs, comprising:
(a) sensing light from view field on a printed surface showing a selected pattern of pixels and determining pixel value of at least some of the pixels in said pattern of pixels, said pattern of pixels constituting a foreground visual image that conveys cognizable information to an observer;
(b) recovering an embedded nonWeb-site-hyperlinked message from the pattern of pixels by determining binary values in the pattern of pixels and recognizing tiles carrying a function, wherein a cell represents a bit of information, said recovering further comprises selecting a function among groups of tiles of different functions by determining weight of the tiles; and
(c) performing a function according to the embedded message to result in resultant information displayable by a portable display suitable for human sensory reception.

32. A handheld device for translating prints into human sensory inputs, comprising:
(a) reader for sensing light from a selected pattern of pixels on a printed surface and determining pixel values of pixels in said pattern of pixels, said pattern of pixels constituting a foreground visual image that conveys cognizable information to an observer and not hyperlinked to a Web-site; and (b) processor that is adapted to recover embedded message from the pattern of pixels, said processor being adapted to determine the embedded message by determining binary values of pixels in said pattern of pixels for performing a function according to the embedded message to result in resultant information displayable by a display suitable for human sensory reception.

33. A handheld interactive device for translating prints into human sensory inputs, comprising:

(a) reader for sensing light from a selected pattern of pixels on a printed surface and determining pixel values of pixels in said pattern of pixels, said pattern of pixels constituting a foreground visual image that conveys cognizable information to an observer and not hyperlinked to a Web-site;

(b) processor that is adapted to recover embedded message from the pattern of pixels, said processor being adapted to determine the embedded message by determining binary values of pixels in said pattern of pixels for performing a function according to the embedded message to result in resultant information displayable by a display suitable for human sensory reception, and (c) display for displaying output, wherein the processor is adapted to in response to recovering the embedded message direct the display to prompt the observer to further use the device on another portion of the selected pattern of pixels or another selected pattern of pixels.

34. The device of claim 33 wherein the device will respond to be activated at least at two different portions of pattern of pixels to launch a display of desired information.

35. An interactive print user interface device for translating prints into human sensory inputs, comprising:

(a) document having printed patterns of pixels, said patterns of pixels constituting foreground visual images that convey cognizable information to an observer;

(b) reader for sensing light from selected portions of said patterns of pixels and determining pixel values of pixels in said patterns of pixels;

(c) display for displaying output; and (d) processor that is adapted to recover an embedded message from a selected pattern of pixels, said processor being adapted to determine the embedded message by determining binary values of pixels in said selected pattern of pixels for performing a function according to the embedded message to result in resultant information displayable by the display suitable for human sensory reception, wherein the document provides patterns of pixels related to the selected patterns of pixels such that the observer can select the related patterns of pixels as a response to the resultant information.

36. The device of claim 35 wherein the related patterns of pixels includes embedded information to control the mechanics of display of the resultant information.

37. The device of claim 35 wherein the related patterns of pixels includes embedded information to control the mechanics of display of the resultant information for one of volume, speed, direction, pause, and exit.

38. The device of claim 35 wherein the related patterns of pixels includes embedded information to provide related resultant information that is a continuation of the resultant information of the selected pattern of pixels.

39. The device of claim 35 wherein resultant information of the selected pattern of pixels prompts the observer to select the related patterns of pixels.

40. The device of claim 35 wherein the printed pattern of pixels have glyph pixels that are printed in one of yellow, infra red, and ultra violet color to render them less conspicuous to human eyes and the reader reads light of only one of yellow, infrared, and ultra violet to recover embedded message from the printed pattern of pixels.

41. The device of claim 35 wherein the embedded message contains parameters on a function to be performed and information on location of the parameters on a function in the pattern of pixels thereby the resultant information rendered is dependent on the parameters on a function and the location of the parameters on a function.

* * * * *